United States Patent
Rofougaran et al.

(10) Patent No.: US 8,280,303 B2
(45) Date of Patent: *Oct. 2, 2012

(54) DISTRIBUTED DIGITAL SIGNAL PROCESSOR

(75) Inventors: Ahmadreza (Reza) Rofougaran, Newport Coast, CA (US); Timothy W. Markison, Lahaina, HI (US)

(73) Assignee: Broadcom Corporation, Irvine, CA (US)

( * ) Notice: Subject to any disclaimer, the term of this patent is extended or adjusted under 35 U.S.C. 154(b) by 707 days.

This patent is subject to a terminal disclaimer.

(21) Appl. No.: 12/202,257

(22) Filed: Aug. 30, 2008

(65) Prior Publication Data

US 2008/0320285 A1   Dec. 25, 2008

Related U.S. Application Data

(63) Continuation-in-part of application No. 12/026,681, filed on Feb. 6, 2008, now abandoned, and a continuation-in-part of application No. 11/700,285, filed on Jan. 31, 2007, now Pat. No. 8,116,294.

(51) Int. Cl.
   *H04B 5/00* (2006.01)
(52) U.S. Cl. ........................ 455/41.1; 455/500
(58) Field of Classification Search ............... 455/41.1, 455/41.2, 41.3, 500; 375/240.01–240.29; 348/715, 716, 717, 718, 719, 720, 721, 722; 712/24, 221, 223, 225
   See application file for complete search history.

(56) References Cited

U.S. PATENT DOCUMENTS

| | | | |
|---|---|---|---|
| 4,807,183 A | 2/1989 | Kung | |
| 5,502,683 A | 3/1996 | Marchioro | |
| 5,754,948 A * | 5/1998 | Metze | 455/41.2 |
| 5,786,912 A | 7/1998 | Kartalopoulos | |
| 5,809,321 A | 9/1998 | Hansen | |
| 5,884,104 A | 3/1999 | Chase | |
| 6,182,203 B1 | 1/2001 | Simar | |
| 6,234,900 B1 | 5/2001 | Cumbers | |
| 6,438,622 B1 | 8/2002 | Haghighi et al. | |
| 6,500,070 B1 | 12/2002 | Tomizawa et al. | |
| 6,663,295 B2 | 12/2003 | Kami et al. | |

(Continued)

FOREIGN PATENT DOCUMENTS

EP   1499070 A2   1/2005

(Continued)

OTHER PUBLICATIONS

Bruce K Gale, "RF, Electrical, and Magnetic Microsystems," date unknown, 8 pages.

(Continued)

*Primary Examiner* — Ping Hsieh
(74) *Attorney, Agent, or Firm* — Garlick & Markison; Timothy W. Markison; Jessica W. Smith

(57) ABSTRACT

A distributed digital signal processor (DSP) includes instruction memory, data memory, a multiply-accumulate module, an instruction MMW transceiver, a data MMW transceiver, and a multiply-accumulate transceiver. The multiply-accumulate module performs a function upon first and second data elements in accordance with a command of an instruction. The instruction MMW transceiver transmits a MMW instruction signal that includes at least a portion of the instruction. The data MMW transceiver transmits a MMW data signal in response to receiving the MMW instruction signal, wherein the MMW data signal includes the first and second data elements. The multiply-accumulate MMW transceiver recovers the first and second data elements from the MMW data signal and recovers a command corresponding to the function from the MMW instruction signal.

20 Claims, 17 Drawing Sheets

U.S. PATENT DOCUMENTS

| | | | |
|---|---|---|---|
| 6,735,663 B2 | 5/2004 | Watts, Jr. et al. |
| 6,735,708 B2 | 5/2004 | Watts, Jr. |
| 6,801,974 B1 | 10/2004 | Watts, Jr. et al. |
| 6,816,925 B2 | 11/2004 | Watts, Jr. |
| 7,065,326 B2 | 6/2006 | Lovberg |
| 7,082,285 B2 | 7/2006 | Linde |
| 7,149,837 B2 | 12/2006 | Watts, Jr. et al. |
| 7,159,099 B2 | 1/2007 | Lucas |
| 7,171,050 B2 | 1/2007 | Kim |
| 7,197,584 B2 | 3/2007 | Huber et al. |
| 7,218,143 B1 | 5/2007 | Young |
| 7,257,093 B1 | 8/2007 | Witzke |
| 7,330,702 B2 | 2/2008 | Chen et al. |
| 7,406,062 B2 | 7/2008 | Hsu |
| 7,444,393 B2 | 10/2008 | Chung |
| 7,903,724 B2 | 3/2011 | Rofougaran |
| 7,929,474 B2 | 4/2011 | Pettus |
| 2002/0022521 A1 | 2/2002 | Idaka |
| 2002/0049806 A1 | 4/2002 | Gatz et al. |
| 2002/0061012 A1 | 5/2002 | Thi |
| 2002/0107010 A1 | 8/2002 | Witte |
| 2002/0164945 A1 | 11/2002 | Olsen |
| 2003/0001882 A1 | 1/2003 | Macer et al. |
| 2003/0017845 A1 | 1/2003 | Doviak |
| 2003/0040284 A1 | 2/2003 | Sato |
| 2003/0059022 A1 | 3/2003 | Nebiker |
| 2003/0078071 A1 | 4/2003 | Uchiyama |
| 2003/0112585 A1 | 6/2003 | Silvester |
| 2003/0126335 A1 | 7/2003 | Silvester |
| 2003/0128712 A1 | 7/2003 | Moriwaki |
| 2003/0162503 A1 | 8/2003 | LeCren |
| 2003/0172380 A1 | 9/2003 | Kikinis |
| 2003/0221036 A1 | 11/2003 | Konetski |
| 2004/0054776 A1 | 3/2004 | Klotz |
| 2004/0062308 A1* | 4/2004 | Kamosa ................ 375/240.16 |
| 2004/0117442 A1 | 6/2004 | Thielen |
| 2004/0123113 A1 | 6/2004 | Mathiassen et al. |
| 2004/0153863 A1 | 8/2004 | Klotz |
| 2004/0157559 A1 | 8/2004 | Sugikawa |
| 2004/0174431 A1 | 9/2004 | Stienstra |
| 2004/0203364 A1 | 10/2004 | Silvester |
| 2004/0266336 A1 | 12/2004 | Patsiokas et al. |
| 2005/0014468 A1 | 1/2005 | Salokannel |
| 2005/0060598 A1 | 3/2005 | Klotz et al. |
| 2005/0124307 A1 | 6/2005 | Ammar et al. |
| 2005/0185364 A1 | 8/2005 | Bell |
| 2005/0250531 A1 | 11/2005 | Takebe et al. |
| 2006/0026348 A1 | 2/2006 | Wallace |
| 2006/0038731 A1 | 2/2006 | Turner |
| 2006/0046762 A1 | 3/2006 | Yoon et al. |
| 2006/0085675 A1 | 4/2006 | Popell |
| 2006/0101164 A1 | 5/2006 | Lee |
| 2006/0148568 A1 | 7/2006 | Schultz et al. |
| 2006/0164271 A1 | 7/2006 | Hirt |
| 2006/0167784 A1 | 7/2006 | Hoffberg |
| 2006/0176851 A1 | 8/2006 | Bennett |
| 2006/0190691 A1 | 8/2006 | Chauve |
| 2006/0203758 A1 | 9/2006 | Tee et al. |
| 2006/0252470 A1 | 11/2006 | Seshadri |
| 2006/0260546 A1 | 11/2006 | Usami |
| 2006/0262026 A1 | 11/2006 | Gainey et al. |
| 2006/0269004 A1 | 11/2006 | Ibrahim |
| 2006/0282635 A1 | 12/2006 | Mather |
| 2007/0015558 A1 | 1/2007 | Zalewski et al. |
| 2007/0038808 A1 | 2/2007 | Yim |
| 2007/0147152 A1 | 6/2007 | Sekiguchi |
| 2007/0155502 A1 | 7/2007 | Wu |
| 2007/0167149 A1 | 7/2007 | Comstock |
| 2007/0229270 A1 | 10/2007 | Rofougaran |
| 2007/0239929 A1 | 10/2007 | Chen |
| 2007/0268481 A1 | 11/2007 | Raskar et al. |
| 2007/0298882 A1 | 12/2007 | Marks et al. |
| 2008/0020843 A1 | 1/2008 | Wolinsky |
| 2008/0028118 A1 | 1/2008 | Sayers et al. |
| 2008/0040541 A1 | 2/2008 | Brockmann |
| 2008/0063236 A1 | 3/2008 | Ikenoue et al. |
| 2008/0070516 A1 | 3/2008 | Lee et al. |
| 2008/0076406 A1 | 3/2008 | Chen et al. |
| 2008/0151847 A1 | 6/2008 | Abujbara |
| 2008/0244148 A1 | 10/2008 | Nix et al. |
| 2009/0006640 A1 | 1/2009 | Brouwer |
| 2009/0198854 A1 | 8/2009 | Rofougaran |
| 2009/0215533 A1 | 8/2009 | Zalewski et al. |
| 2010/0056132 A1 | 3/2010 | Gallagher |
| 2010/0120447 A1 | 5/2010 | Anderson et al. |
| 2010/0146199 A1 | 6/2010 | Shaeffer |
| 2010/0273468 A1 | 10/2010 | Bienas et al. |
| 2011/0134868 A1 | 6/2011 | Lee et al. |

FOREIGN PATENT DOCUMENTS

| | | |
|---|---|---|
| WO | 2009002464 A2 | 12/2008 |

OTHER PUBLICATIONS

Dr. Lynn Fuller, "Microelectromechanical Systems (MEMs) Applications—Microphones,"Rochester Institute of Technology Microelectronic Engineering, Apr. 25, 2005, pp. 1-43.

Radio Control Adapter; IBM Technical Disclosure Bulletin NN86081337; IBM; Aug. 1986.

Xilinx Inc.: Spartan-3AN FPGA Family Data Sheet, DS557, Jun. 2, 2008, pp. 5.

Haworth, et al.; Public Security Screening for Metallic Objects with Millimetre-Wave Images; Heriot-Watt University; United Kingdom; pp. 1-4.

Elsadek, et al.; "A Compact 3-D Microwave Holographic Pointer System Using a Size Reduced Microstrip Planar Array"; Department of Electrical and Computer Engineering; University of California; pp. 1-5.

Elsadek, et al.; "Microstrip Multi-element Diversity Antenna Array for Three Dimensional Microwave Holographic Input Pointer (Holo3D)"; Department of Electrical and Computer Engineering; University of California; pp. 1-4.

E3 Wii Controller; Nintendo Wilmote; Technology Limitations; XGAMING, Inc.; pp. 1-5.

* cited by examiner

DISTRIBUTED DIGITAL SIGNAL PROCESSOR

This patent application is claiming priority under 35 USC §120 as a continuation in part patent application of co-pending patent application entitled COMPUTING DEVICE WITH HANDHELD AND EXTENDED COMPUTING UNITS, having a filing date of Feb. 6, 2008, and a Ser. No. 12/026,681 and of co-pending patent application entitled RF BUS CONTROLLER, having a filing date of Jan. 31, 2007, and a Ser. No. 11/700,285.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing devices and more particularly to components of such computing devices.

2. Description of Related Art

Communication systems are known to support wireless and wire lined communications between wireless and/or wire lined communication devices. Such communication systems range from national and/or international cellular telephone systems to the Internet to point-to-point in-home wireless or wired networks. The wireless and/or wire lined communication devices may be personal computers, laptop computers, personal digital assistants (PDA), cellular telephones, personal digital video players, personal digital audio players, global positioning system (GPS) receivers, video game consoles, entertainment devices, etc.

Many of the communication devices include a similar basic architecture: that being a processing core, memory, and peripheral devices. The processing core typically includes a digital signal processor (DSP) and may further include a microprocessor or the like. The memory stores operating instructions that the processing core uses to generate data, which may also be stored in the memory. The peripheral devices allow a user of the communication device to direct the processing core as to which programs and hence which operating instructions to execute, to enter data, etc. and to see the resulting data. For example, a cellular telephone includes a keypad, a display, a microphone and a speaker for such functions.

As integrated circuit technology advances, the basic architecture of a DSP and memory is increasing in complexity, capabilities, and size reduction. However, communication between these components and/or within these components is done using traces (e.g., on an IC and/or on a PCB), which requires drivers to drive the lines. As is known, the transferring of data via the traces and drivers consumes a significant amount of power, which produces heat. With many DSP architectures, heat dissipation is a critical issue.

Therefore, a need exists for a DSP that reduces power consumption by reducing interconnecting traces and associated driver circuitry.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
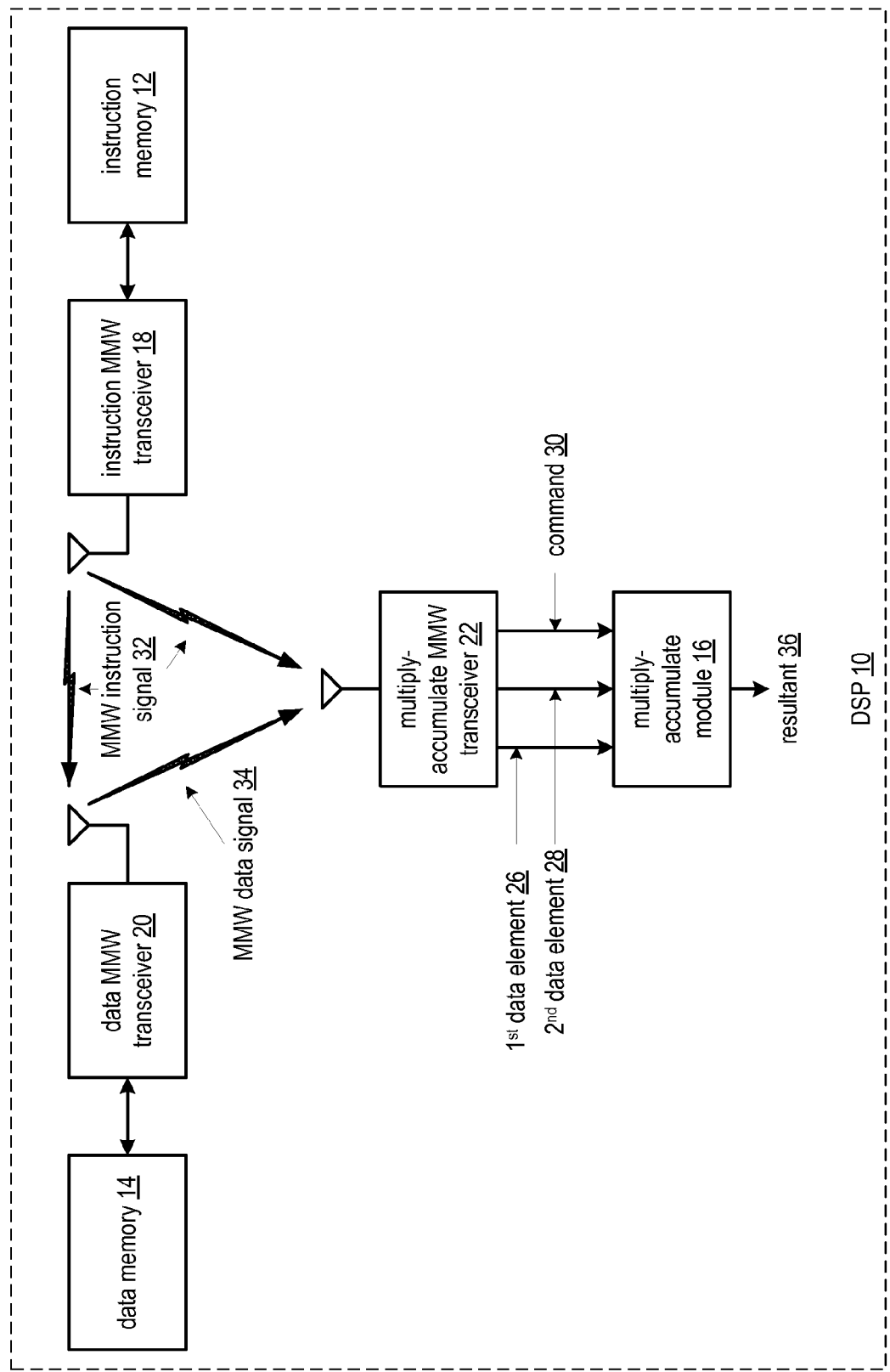
FIG. 1 is a schematic block diagram of an embodiment of a distributed DSP in accordance with the present invention.

FIG. 1 is a schematic block diagram of an embodiment of a distributed DSP 10 that includes an instruction memory 12, a data memory 14, a multiply-accumulate module 16, an instructions millimeter wave (MMW) transceiver 18, a data MMW transceiver 20, and a multiply-accumulate MMW transceiver 22. The multiply-accumulate module 16 may include at least one multiplier, registers, and may further includes at least one of an arithmetic logic unit (ALU), an adder, and a bit manipulation module (e.g., barrel shifter, shift left, shift right, etc.).

Each of the MMW transceivers 18-22 may include a baseband processing module, a receiver section, and a transmitter section. The transmitter and receiver sections may share one or more antennas or each may have its own one or more antennas. The baseband processing module converts outbound data (e.g., an instruction and/or data) into an outbound symbol stream in accordance with a data modulation scheme and a channel usage scheme. The data modulation scheme may be binary phase shift keying (BPSK), quadrature phase shift keying (QPSK), frequency shift keying (FSK), minimum shift keying (MSK), amplitude shift keying (ASK), quadrature amplitude modulation (QAM), a combination thereof, and/or variations thereof The channel usage scheme may be time division multiple access (TDMA), frequency divisional multiple access (FDMA), code division multiple access (CDMA), orthogonal frequency division multiplexing (OFDM), a combination thereof, and/or variations thereof In addition, the baseband processing module may also utilize a scrambling scheme, an encoding scheme, a data puncture scheme, an interleaving scheme, space-time-frequency encoding, a beamforming scheme, a frequency to time domain conversion, and/or a combination thereof to produce the outbound symbol stream.

The transmitter section converts the outbound symbol stream into an outbound RF signal that has a carrier frequency within a given frequency band (e.g., 57-66 GHz, or any other in the microwave frequency range of 3-300 GHz.). In an embodiment, this may be done by mixing the outbound symbol stream with a local oscillation to produce an up-converted signal. One or more power amplifiers and/or power amplifier drivers amplifies the up-converted signal, which may be RF bandpass filtered, to produce the outbound RF signal. In another embodiment, the transmitter section includes an oscillator that produces an oscillation. The outbound symbol stream provides phase information (e.g., $+/- \Delta\theta$ [phase shift] and/or $\theta(t)$ [phase modulation]) that adjusts the phase of the oscillation to produce a phase adjusted RF signal, which is transmitted as the outbound RF signal. In another embodiment, the outbound symbol stream includes amplitude information (e.g., $A(t)$ [amplitude modulation]), which is used to adjust the amplitude of the phase adjusted RF signal to produce the outbound RF signal.

In yet another embodiment, the transmitter section includes an oscillator that produces an oscillation. The outbound symbol provides frequency information (e.g., $+/- \Delta f$ [frequency shift] and/or $f(t)$ [frequency modulation]) that adjusts the frequency of the oscillation to produce a frequency adjusted RF signal, which is transmitted as the outbound RF signal. In another embodiment, the outbound symbol stream includes amplitude information, which is used to adjust the amplitude of the frequency adjusted RF signal to produce the outbound RF signal. In a further embodiment, the transmitter section includes an oscillator that produces an oscillation. The outbound symbol provides amplitude information (e.g., $+/- \Delta A$ [amplitude shift] and/or $A(t)$ [amplitude modulation]) that adjusts the amplitude of the oscillation to produce the outbound RF signal.

The receiver section amplifies an inbound RF signal to produce an amplified inbound RF signal. The receiver section may then mix in-phase (I) and quadrature (Q) components of the amplified inbound RF signal with in-phase and quadrature components of a local oscillation to produce a mixed I signal and a mixed Q signal. The mixed I and Q signals are combined to produce an inbound symbol stream. In this embodiment, the inbound symbol may include phase information (e.g., $+/- \Delta\theta$ [phase shift] and/or $\theta(t)$ [phase modulation]) and/or frequency information (e.g., $+/- \Delta f$ [frequency shift] and/or $f(t)$ [frequency modulation]). In another embodiment and/or in furtherance of the preceding embodiment, the inbound RF signal includes amplitude information (e.g., $+/- \Delta A$ [amplitude shift] and/or $A(t)$ [amplitude modulation]). To recover the amplitude information, the receiver section includes an amplitude detector such as an envelope detector, a low pass filter, etc.

The baseband processing module converts the inbound symbol stream into inbound data (e.g., an instruction and/or data) in accordance with the data modulation scheme and the channel usage scheme. In addition to demodulating the inbound symbol stream, the baseband processing module may also utilize a descrambling scheme, a decoding scheme, a data de-puncture scheme, a de-interleaving scheme, space-time-frequency decoding, a time to frequency domain conversion, and/or a combination thereof to produce the inbound data.

In this embodiment, the instruction memory 12 stores a plurality of instructions and the data memory 14 stores a plurality of data elements. The instruction and data memories 12 and 14 may be separate memory devices or a shared memory device. Such a memory device may be a read-only memory, random access memory, volatile memory, non-volatile memory, static memory, dynamic memory, flash memory, cache memory, and/or any device that temporarily or permanently stores digital data.

The plurality of instructions stored in the instruction memory 12 may be associated with one or more system and/or user algorithms. An instruction of the plurality of instructions may be an op-code of a plurality of operation codes, a code of a plurality of assembly language codes, one of a software instruction set, a code of a plurality of machine codes, etc. Regardless of the format, the instruction may include addresses for one or more operands (e.g., data elements) and a command regarding a particular function (e.g.,. multiply, add, shift, logic function, etc.).

For a given instruction, the instruction MMW transceiver 18 receives the instruction from the instruction memory 12 and converts it into a MMW instruction signal 32. The instruction MMW transceiver 18 transmits the MMW instruction signal 32, which is received by the data MMW transceiver 20 and the multiply-accumulate MMW transceiver 22.

The data MMW transceiver 20 recaptures the instruction, or at least the addresses of the data elements, and provides this information to the data memory 14. The data memory 14 responds by providing first and second data elements to the data MMW transceiver 20. The data MMW transceiver converts the first and second data elements into a MMW data signal 34, which is subsequently transmitted.

The multiply-accumulate MMW transceiver 22 receives the MMW instruction signal 32 and the MMW data signal 34, recovers the first and second data elements 26 and 28 from the MMW data signal 34, and recovers a command 30 corresponding to the function from the MMW instruction signal 32. While not shown, one or more of the MMW transceivers 18-22 and/or their associated components 12-16 may include buffers to allow for synchronization of the command 30 and the data elements 26 and 28 being provided to the multiply-accumulate module 16.

The multiply-accumulate module 16 performs a function upon the first and second data elements 26 and 28 in accordance with the command 30 to produce a resultant 36. For example, the command may be a multiply and accumulate function such that the module 16 multiplies the first and second data elements to produce a product, which is added to a previous resultant. In addition, or in the alternative, the function may be a different arithmetic function (e.g., divide, substrate, square, etc.), may a be logic function (e.g., AND, OR, NAND, etc.), and/or may be a bit manipulation function (e.g., shift left, shift right, barrel shift, etc.).

Figure 2:
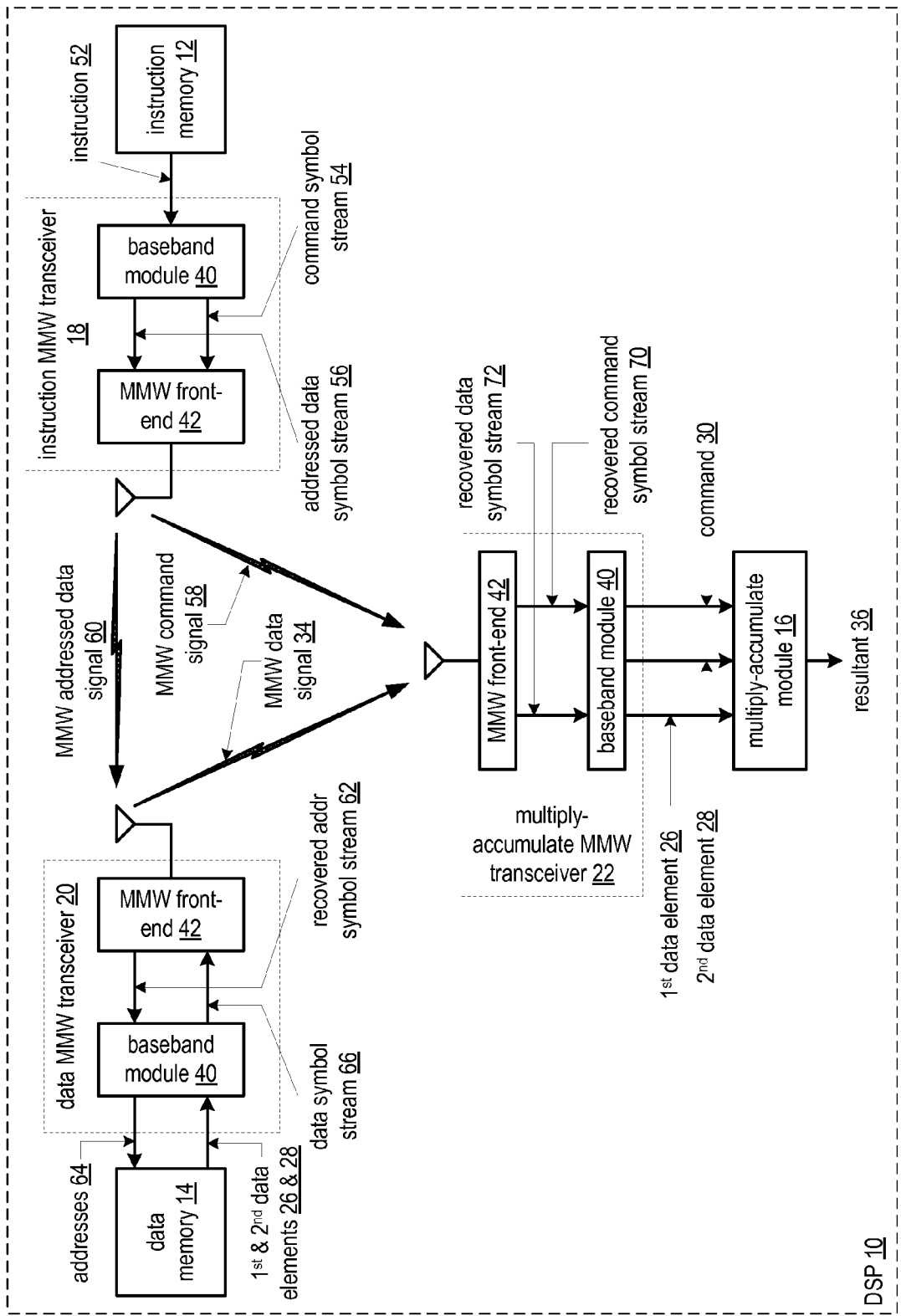
FIG. 2 is a schematic block diagram of another embodiment of a distributed DSP in accordance with the present invention.

FIG. 2 is a schematic block diagram of another embodiment of a distributed DSP 10 includes the instruction memory 12, the data memory 14, the multiply-accumulate module 16, the instructions millimeter wave (MMW) transceiver 18, the data MMW transceiver 20, and the multiply-accumulate MMW transceiver 22. In this embodiment, each of the MMW transceivers 18-22 includes a baseband processing module 40 and a MMW front end 42. The MMW front end 42 may include the transmitter section and receiver section previously discussed.

The baseband processing module 40 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Further note that, the memory element stores, and the processing module executes, hard coded and/or operational instructions corresponding to at least some of the steps and/or functions illustrated in FIGS. 1-17.

In this embodiment, the baseband processing module 40 of the instruction MMW transceiver 18 retrieves an instruction 52 from the instruction memory 12. Note that the baseband processing module 40 may retrieve multiple instructions from the instruction memory 12 at a given time. However, one instruction 52 will be discussed for ease of illustration.

The baseband processing module 40 interprets the instruction 52 to identify the function from a plurality of functions, an address of the first data element, and an address of the second data element. For example, if the instruction is to multiply the first and second data elements, the baseband processing module 40 would identify the addresses of the first and second data elements and also identify the multiply command. The baseband processing module continues by converting the command corresponding to the function into a command symbol stream 54 and by converting the addresses of the first and second data elements into an addressed data symbol stream 56. This may be done as previously discussed.

The MMW front end 42 of the instruction MMW transceiver 16 converts the command symbol stream 54 into a MMW command signal 58 and converts the addressed data symbol stream 56 into a MMW addressed data signal 60. In this instance, the MMW instruction signal 32 includes the MMW command signal 58 and the MMW data signal 60. The MMW front end 42 then transmits the MMW signals 58 and 60, which may be done in a time division multiple access manner, on different channels, using a frequency division multiple access manner, and/or a code division multiple access manner.

The data MMW front end 42 receives the MMW addressed data signal 60 and recovers therefrom the addressed data symbol stream 62. The MMW front end 42 provides the recovered addressed data symbol stream 62 to the baseband processing module 40, which recovers the addresses 64 of the first and second data elements 26 & 28 therefrom. The baseband processing module 40 then provides the addresses 64 to the data memory 14 and subsequently receives the first and second data elements 26 & 28.

The baseband processing module 40 converts the first and second data elements 26 & 28 into the data symbol stream 66. The MMW front end 42 of the data MMW transceiver 20 converts the data symbol stream 66 into the MMW data signal 34.

The multiply-accumulate MMW front-end 42 recovers the data symbol stream 72 from the MWM data signal 34 and recovers the command symbol stream 70 from the MMW command signal 56. The multiply-accumulate baseband processing module 40 recovers the first and second data elements 26 & 28 from the data symbol stream 72 and recovers the command 30 from the command symbol stream 70. The baseband processing module 40 provides the first and second data elements 26 & 28 and the command 30 to the multiply-accumulate module 16, which generates the resultant 36 therefrom.

In this embodiment, controlling of the DSP 10 executing an algorithm or plurality of algorithms is done within the instruction MMW transceiver 18. As such, the baseband processing module 40 of the instruction MMW transceiver 18 functions as a program counter, a fetch and decode module, and may further include registers for temporary storage.

Figure 3:
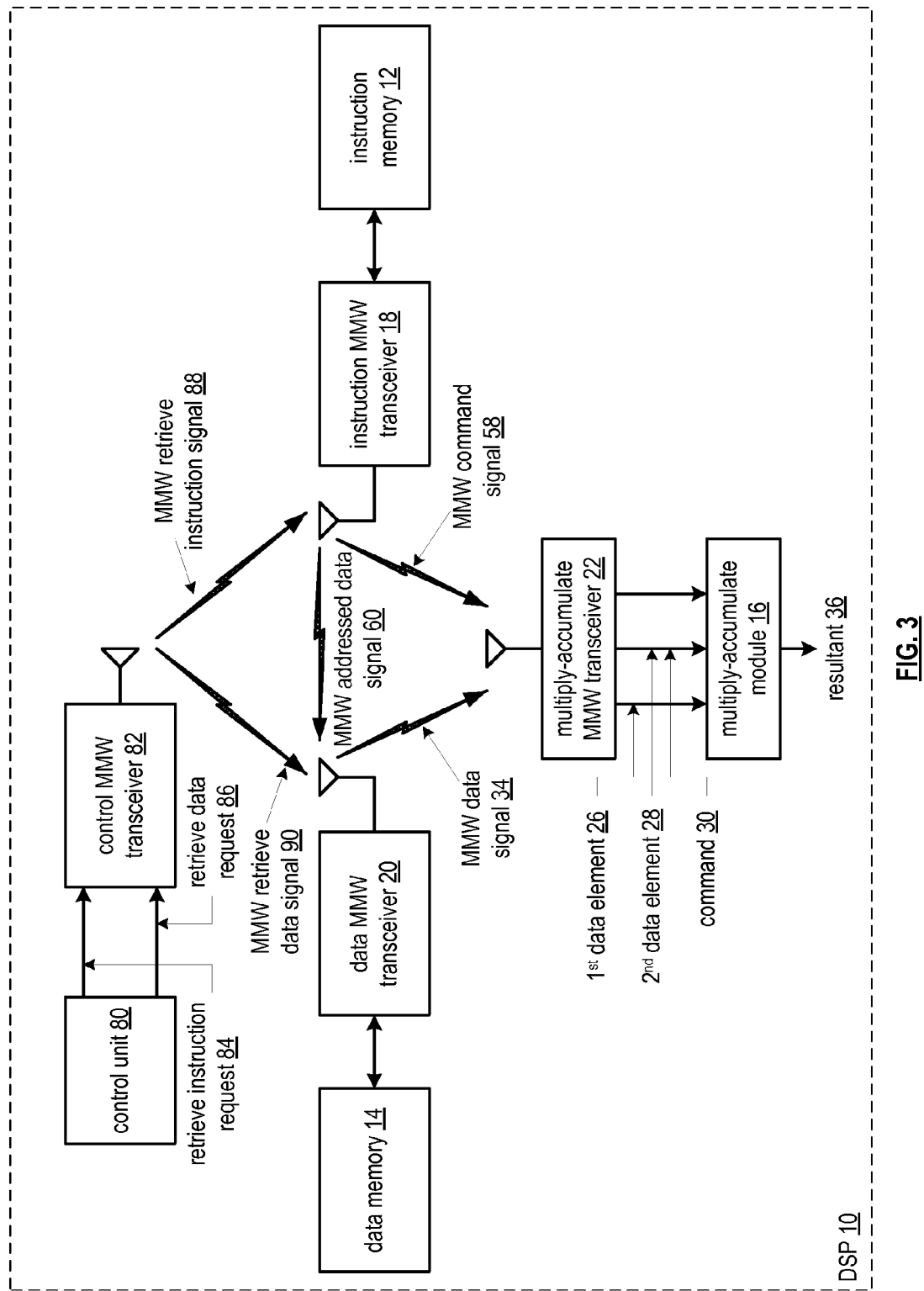
FIG. 3 is a schematic block diagram of another embodiment of a distributed DSP in accordance with the present invention.

FIG. 3 is a schematic block diagram of another embodiment of a distributed DSP 10 includes the instruction memory 12, the data memory 14, the multiply-accumulate module 16, the instructions millimeter wave (MMW) transceiver 18, the data MMW transceiver 20, and the multiply-accumulate MMW transceiver 22. In this embodiment, the DSP 10 further includes a control unit 80 and a control MMW transceiver 82. The instruction memory 12, the data memory 14, the multiply-accumulate module 16, the instructions millimeter wave (MMW) transceiver 18, the data MMW transceiver 20, and the multiply-accumulate MMW transceiver 22 function as previously described.

The control unit 80, which may be a separate processing module similar to the baseband processing module 40 or may be included with one of the baseband processing modules 40, is operable to identify the instruction and the data elements based on execution of an algorithm. The control unit 80 then generates a retrieve instruction request 84 for the instruction and a retrieve data request 86 for the data elements based on the execution of the algorithm.

The control MMW transceiver 82, which may be implemented similarly to MMW transceivers 18-22, converts the retrieve instruction request 84 into a MMW retrieve instruction signal 86. This signal 86 is received by the instruction MMW transceiver 18, which processes the signal 86 such that the instruction is retrieved from the instruction memory 12 and converted into the MMW instruction signal 32, which may include the MMW command signal 58 and/or the MMW addressed data signal 60.

The control MMW transceiver 82 converts the retrieve data request 86 into a MMW data request signal 90. In an embodiment, the data MMW transceiver 20 receives the MMW retrieve data signal 90. In this instance, the data memory 14 retrieves the first and second data elements based on the MMW retrieve data signal 90. In an alternative, the data memory 14 may retrieve the first and second data elements in accordance with the MMW addressed data signal 60, which the instruction MMW transmitter 18 transmits in response to receiving the MMW retrieve instruction signal 86.

Figure 4:
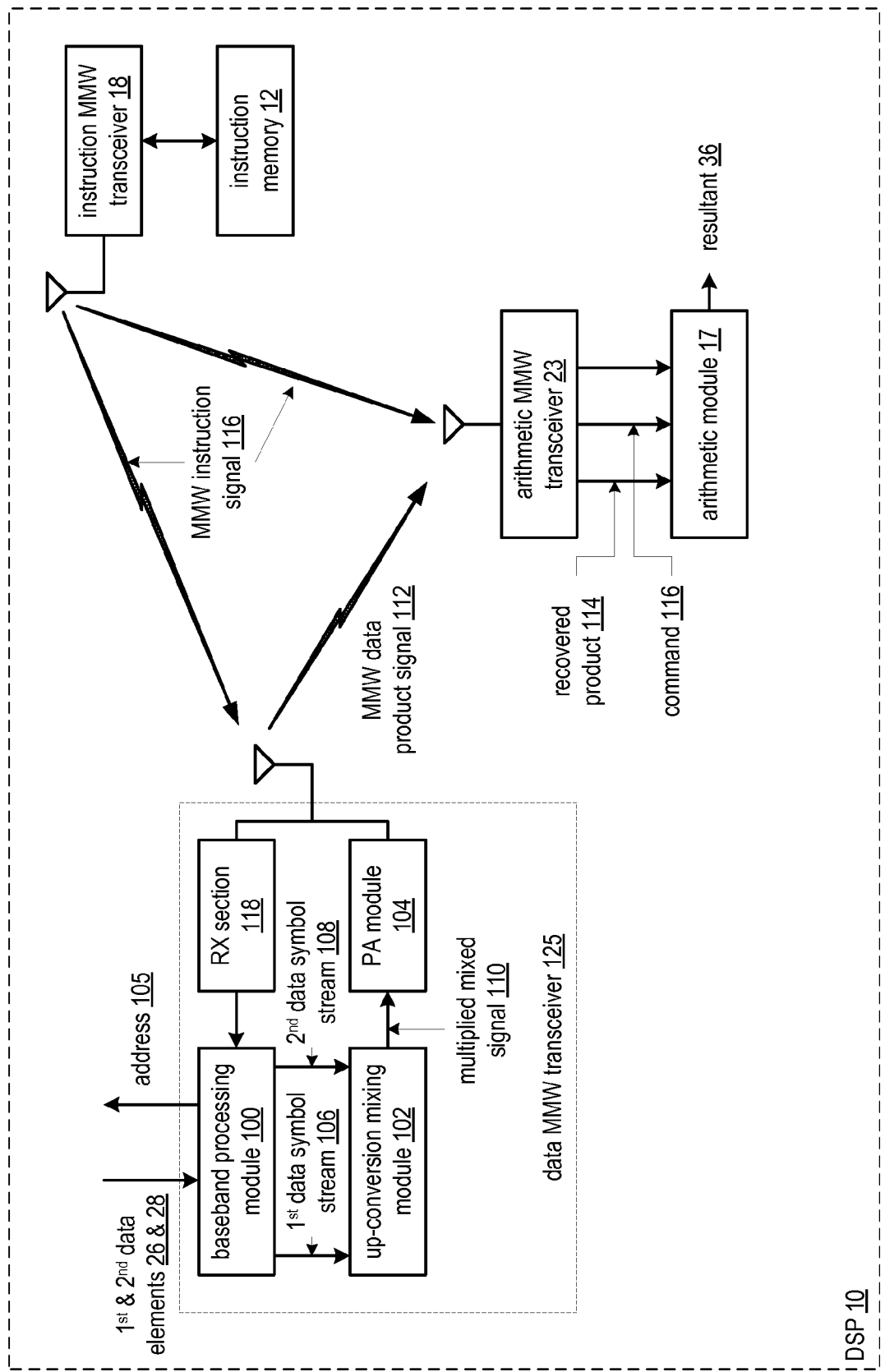
FIG. 4 is a schematic block diagram of another embodiment of a distributed DSP in accordance with the present invention.

FIG. 4 is a schematic block diagram of another embodiment of a distributed DSP 10 that includes the instruction memory 12, the data memory 14, an arithmetic module 17, the instructions millimeter wave (MMW) transceiver 18, a data MMW transceiver 125, and an MMW transceiver 23. In this embodiment, the data MMW transceiver 125 includes a baseband processing module 100 (which may be similar in construct to baseband processing module 40 of FIG. 2), an up-conversion module 102, a power amplifier (PA) module 104, and a receiver (RX) section 118.

The instruction MMW transceiver 18 functions to generate a MMW instruction signal 116 that includes an instruction retrieved from the instruction memory 12. The instruction in this example includes a multiply command, data addresses, and an arithmetic command. The receiver section 118 receives the MMW instruction signal 116 and extracts the multiply command and the data addresses, which are provided to the baseband processing module 100.

The baseband processing module 100 provides the addresses 105 to the data memory 14, which responds by providing the first and second data elements 26 & 28 to the baseband processing module 100. The baseband processing module 100 converts the first data element 26 into a first data symbol stream 106 and converts the second data element 28 into a second data symbol stream 108. In addition, the baseband processing module 100 recovers the multiply command from the MMW instruction signal 116 and provides it to the up conversion mixing module 102.

The up conversion mixing module 102 mix the first data symbol stream 106, the second data symbol stream 108, and a transmit local oscillation in accordance with the multiply command to produce a multiplied mixed signal 110 that includes the product of first and second data elements. Embodiments of the up conversion mixing module 102 will be described in greater detail with reference to FIGS. 5 and 6.

The power amplifier module 104, which includes one or more power amplifier drivers and/or one or more power amplifiers coupled in series and/or in parallel, amplify the multiplied mixed signal 110 to produce a MMW data product signal 112.

The arithmetic MMW transceiver 23 recovers the product of first and second data elements 114 from the MMW data product signal 112 and recovers the command 116 corresponding to the arithmetic function from the MMW instruction signal 116. The arithmetic function may be a mathematical function (e.g., add, subtract, divide, etc.), a logic function (e.g., AND, OR, etc.), and/or a bit manipulation (e.g., a shift function).

The arithmetic module 17 (which may include an ALU, a floating point unit, a bit manipulation module, an adder section, etc.) performs an arithmetic function upon the product of first and second data elements to produce a resultant 36. As an example, if the instruction is a multiply and accumulate function, the multiplying is done in the data MMW transceiver prior to transmission. Thus, the arithmetic module 17 performs the accumulate portion of the multiply and accumulate function.

Figure 5:
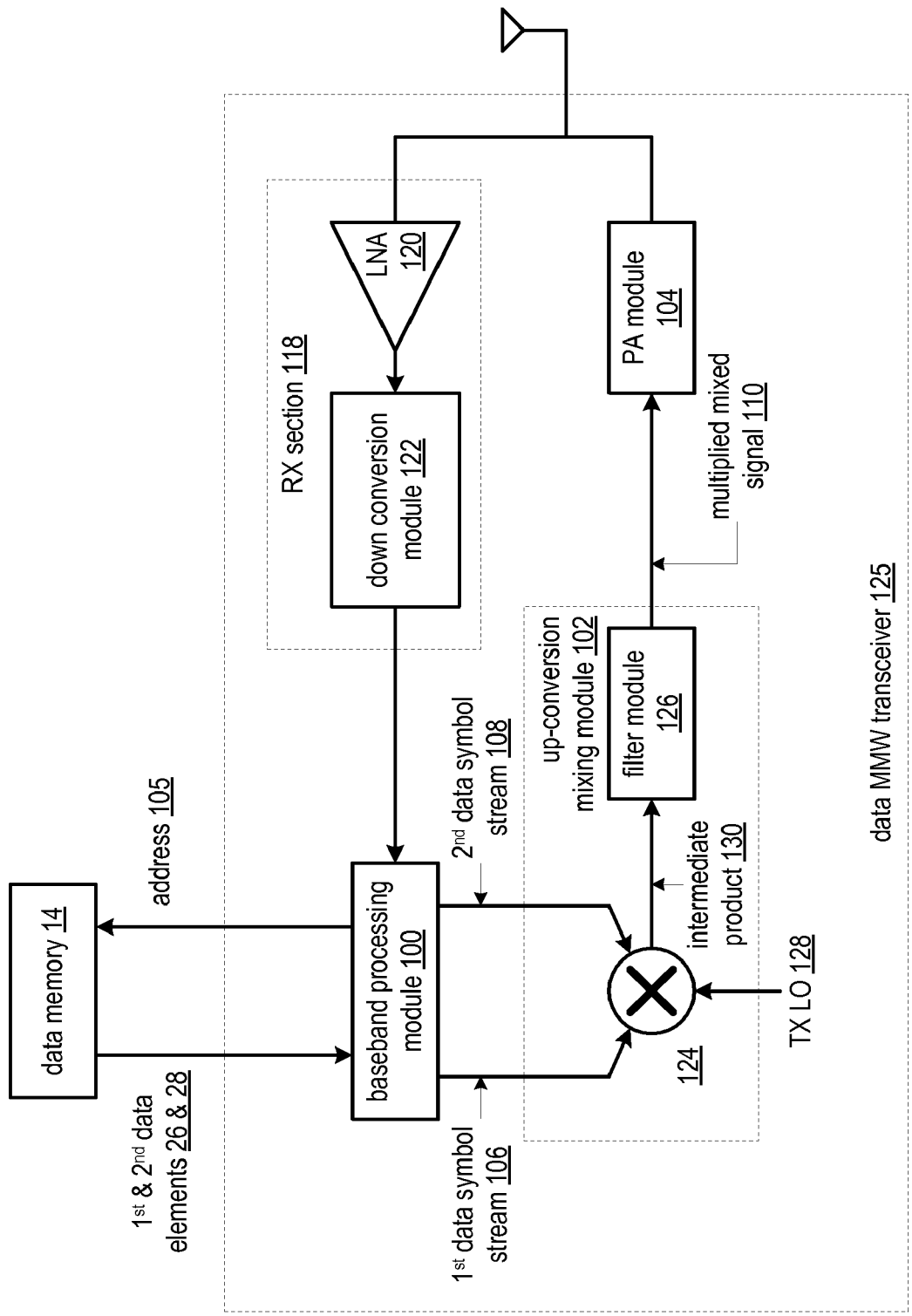
FIG. 5 is a schematic block diagram of an embodiment of a data MMW transceiver in accordance with the present invention.

FIG. 5 is a schematic block diagram of an embodiment of a data MMW transceiver 125, wherein the receiver section 118 includes a low noise amplifier 120 and a down conversion module 122. In addition, the up conversion mixing module 102 includes a multiplier 124 and a filter module 126.

The low noise amplifier 120 amplifies the MMW instruction signal 116 to produce an amplified MMW instruction signal. The down conversion mixing module 122 converts the amplified MMW instruction signal into an instruction symbol stream in accordance with a local oscillation. The baseband processing module 100 functions to recover the instruction from the instruction symbol stream, interpret the instruction to identify addresses of the first and second data elements and a multiply function, provide the addresses of the first and second data elements to the data memory 14, receive the first and second data elements from the data memory, convert the first data element into a first data symbol stream, and convert the second data element into a second data symbol stream.

The multiplier 124 of the up conversion mixing module 102 multiplies the first data symbol stream 106, the second data symbol stream 108, and the transmit local oscillation 128 to produce an intermediate product 130. The filter module 126, which may be a single side band filter, allows the product of the three signals to pass substantially unattenuated and attenuates other signals components that result from the multiplying to produce the multiplied mixed signal 110.

Figure 6:
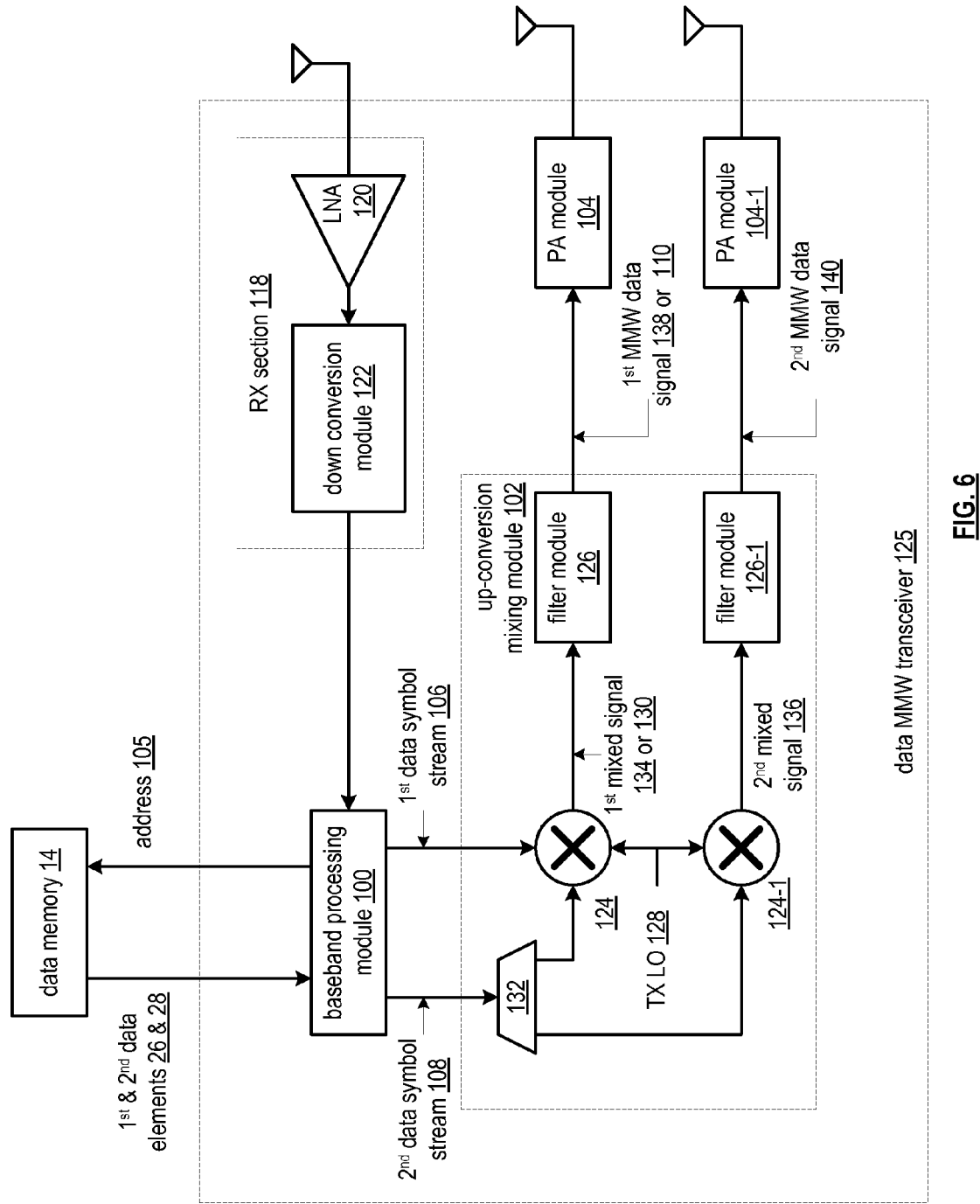
FIG. 6 is a schematic block diagram of another embodiment of a data MMW transceiver in accordance with the present invention.

FIG. 6 is a schematic block diagram of another embodiment of a data MMW transceiver 125 includes the baseband processing module 100, the up-conversion mixing module 102, power amplifier modules 104 & 104-1, and the receiver section 118. The up conversion mixing module 102 includes multipliers 124 & 124-1, filter modules 126 & 126-1, and a multiplexer 132.

When the instruction includes the multiply function, the multiplexer 132 provides the second data symbol stream 108 to the first multiplier 124. The first multiplier 124 multiplies the first data symbol stream 106, the second data symbol stream 108, and the transmit local oscillation 128 to produce the intermediate product 130. The first filter module 126 filters the intermediate product 130 to produce the multiplied mixed signal 110.

When the instruction includes a data request, the multiplexer 132 provides the second data symbol stream 108 to the second multiplier 124-1. The first multiplier 124 multiplies the first data symbol stream 106 and the transmit local oscillation 128 to produce a first mixed signal 134. The first filter module 126 filters the first mixed signal 134 to produce a first MMW data signal 138. The second multiplier 124-1 multiplies the second data symbol stream 108 and the transmit local oscillation 128 to produce a second mixed signal 136. The second filter module 126-1 filters the second mixed signal 136 to produce a second MMW data signal 140. The second power amplifier 104-1 amplifies the second MMW data signal.

In this embodiment, the multiplication of the first and second data elements may be done in the MMW transceiver 125. Alternatively, the MMW transceiver may provide the first and second data elements for multiplication in the arithmetic module 17 and/or in the arithmetic MMW transceiver 23.

Figure 7:
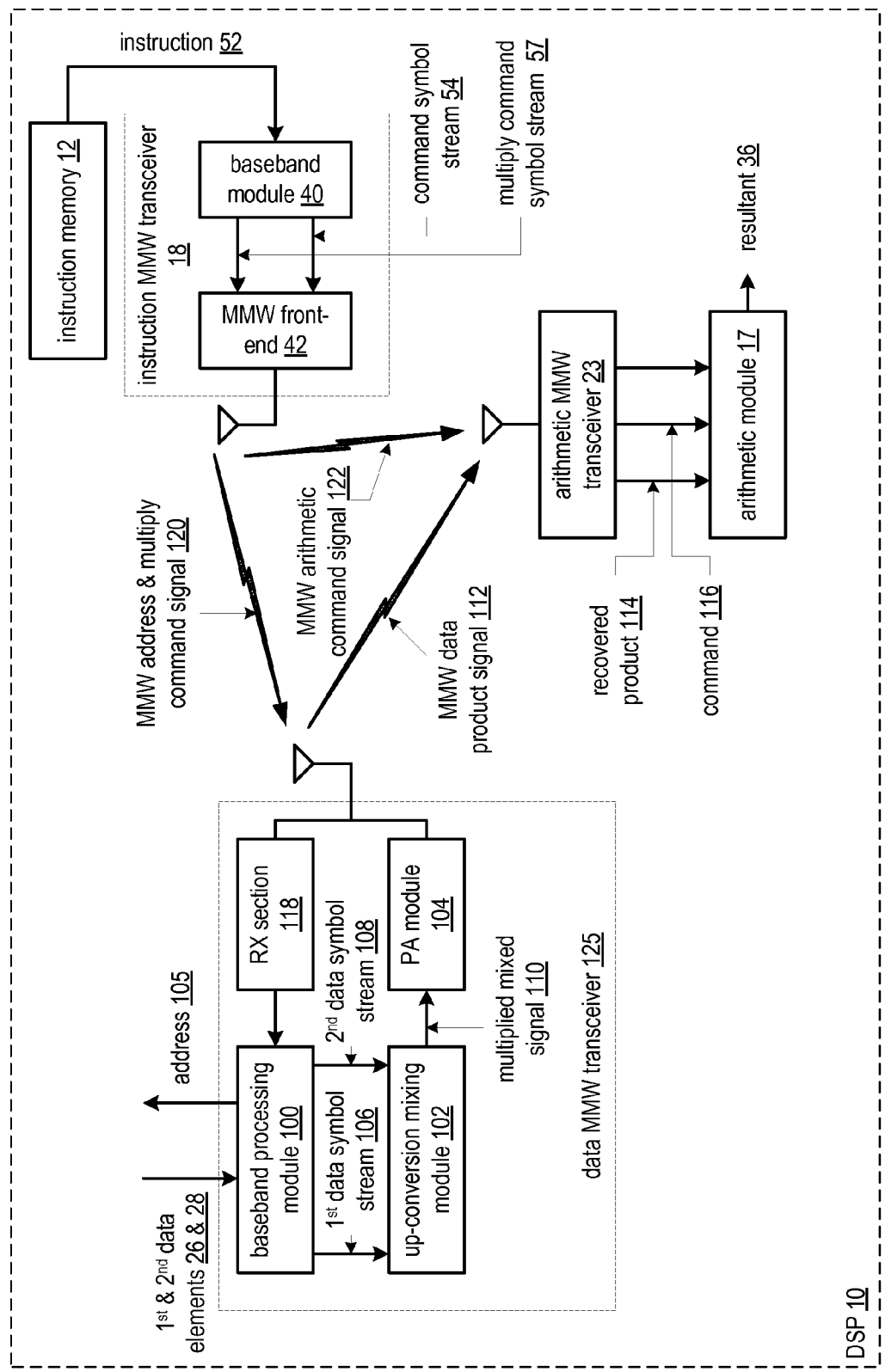
FIG. 7 is a schematic block diagram of another embodiment of a distributed DSP in accordance with the present invention.

FIG. 7 is a schematic block diagram of another embodiment of a distributed DSP 10 that includes the instruction memory 12, the data memory 14, the arithmetic module 17, the instructions millimeter wave (MMW) transceiver 18, the data MMW transceiver 125, and the MMW transceiver 23. The data MMW transceiver 125 includes a baseband processing module 100 (which may be similar in construct to baseband processing module 40 of FIG. 2), an up-conversion module 102, a power amplifier (PA) module 104, and a receiver (RX) section 118. In addition, the instruction MMW transceiver 18 includes the baseband processing module 40 and the MMW front-end 42.

The baseband processing module 40 retrieves the instruction 52 from the instruction memory 12 and interprets the instruction 52 to identify a multiply command corresponding to the multiply function of the instruction, an arithmetic command, an address of the first data element, and an address of the second data element. The baseband processing module 40 then converts the arithmetic command into a command symbol stream 54 and converts the multiply command and the addresses of the first and second data elements into an address and multiply command symbol stream 57.

The MMW front end 42 converts the command symbol stream 54 into a MMW arithmetic command signal 122 and converts the address and multiply command symbol stream 57 into a MMW address and command signal 120. In this embodiment, controlling of the DSP 10 executing an algorithm or plurality of algorithms is done within the instruction MMW transceiver 18. As such, the baseband processing module 40 of the instruction MMW transceiver 18 functions as a program counter, a fetch and decode module, and may further include registers for temporary storage.

Figure 8:
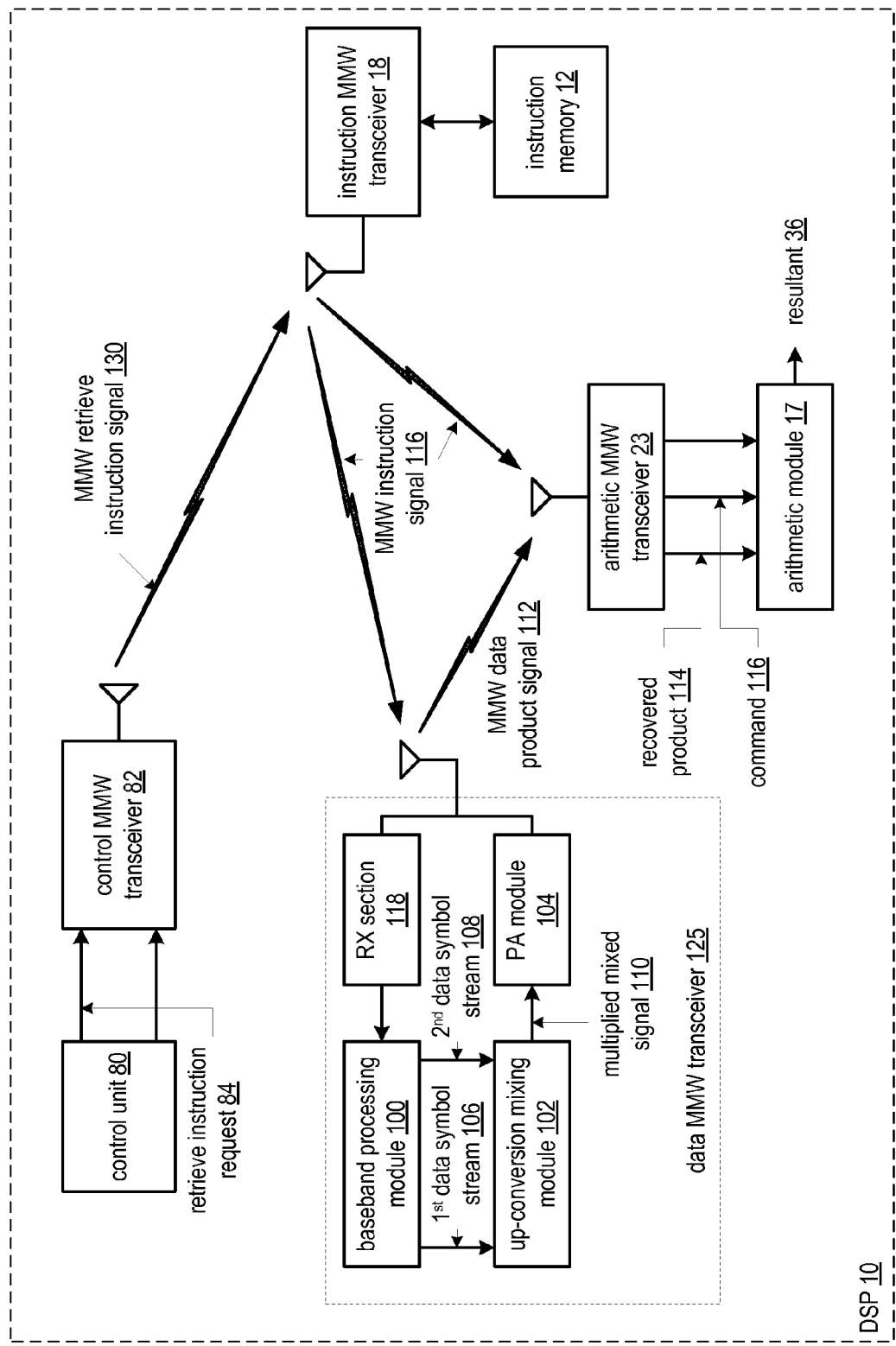
FIG. 8 is a schematic block diagram of another embodiment of a distributed DSP in accordance with the present invention.

FIG. 8 is a schematic block diagram of another embodiment of a distributed DSP 10 that includes the instruction memory 12, the data memory 14, the arithmetic module 17, the instructions MMW transceiver 18, the data MMW transceiver 125, the control unit 80, the control MMW transceiver 82, and the MMW transceiver 23. The data MMW transceiver 125 includes a baseband processing module 100 (which may be similar in construct to baseband processing module 40 of FIG. 2), an up-conversion module 102, a power amplifier (PA) module 104, and a receiver (RX) section 118.

In this embodiment, the control unit 80 functions to identify the instruction and the first and second data elements based on execution of an algorithm. The control unit 80 also generates a retrieve instruction request 84 for the instruction based on the execution of the algorithm.

The control MMW transceiver 82 converts the retrieve instruction request 84 into a MMW retrieve instruction signal 130. The instruction MMW transceiver receives the MMW retrieve instruction signal 130, recovers the request 84, and provides it to the instruction memory 12. The instruction MMW transceiver 18 receives the instruction from the instruction memory 12, converts it into the MMW instruction signal 116 that is transmitted to the data MMW transceiver 125 and the arithmetic MMW transceiver 23.

Figure 9:
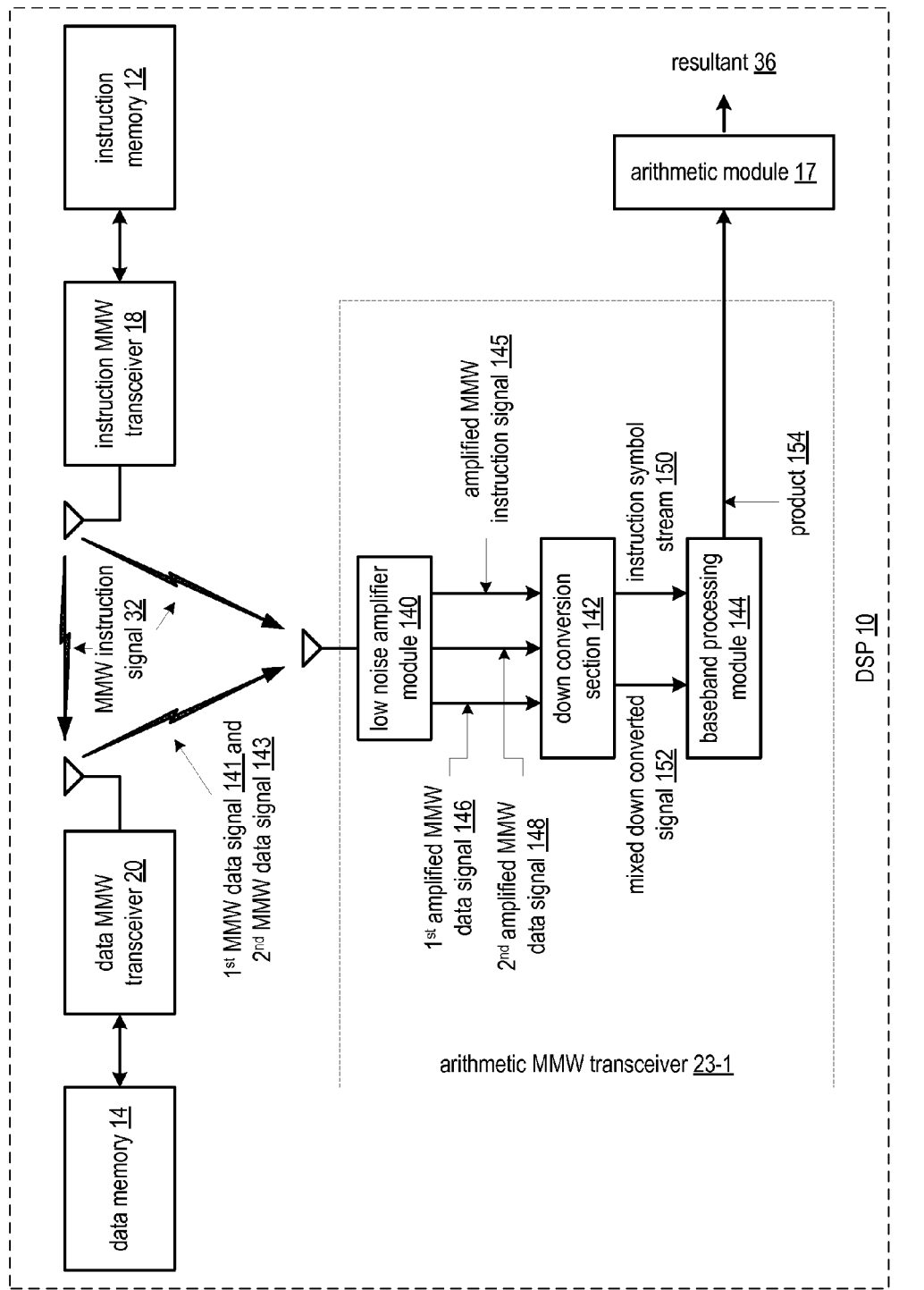
FIG. 9 is a schematic block diagram of another embodiment of a distributed DSP in accordance with the present invention.

FIG. 9 is a schematic block diagram of another embodiment of a distributed DSP 10 that includes the instruction memory 12, the data memory 14, the arithmetic module 17, the instructions MMW transceiver 18, the data MMW transceiver 20, and an arithmetic MMW transceiver 23-1. The arithmetic MMW transceiver 23-1 includes a low noise amplifier module 140, a down conversion section 142, and a baseband processing module 144, which may be processing device similar to baseband processing module 40.

In this embodiment, the data memory 14, the data MMW transceiver 20, the instruction memory 12, and the instruction MMW transceiver 16 function as previously described to provide the MMW instruction signal 32, a first MMW data signal 141, and a second MMW data signal 143. The low noise amplifier section 140, which includes one or more low noise amplifiers, functions to amplify the MMS instruction signal 32 to produce an amplified MMW instruction signal 145, amplify the first MMW data signal 141 to produce a first amplified MMW data signal 146, and amplify the second MMW data signal 143 to produce a second amplified MMW data signal 148.

The down conversion section 142 functions to convert the amplified MMW instruction signal 145 into an instruction symbol stream 150 and mixes the first amplified MMW data signal 146, the second amplified MMW data signal 148, and a receive local oscillation to produce a mixed down converted signal 152 in accordance with a multiply command. Various embodiments of the down conversion section 142 will be described in greater detail with reference to FIGS. 10 and 11.

The baseband processing module 150 functions to recover the command and the multiply command from the instruction symbol stream, convert the mixed down converted signal into the product of first and second data elements, and provide the product of the first and second data elements to the arithmetic module 154. The arithmetic module 17 performs an arithmetic function upon the product 54 of first and second data elements of the plurality of data elements in accordance with an instruction of the plurality of instructions to produce a resultant 36.

Figure 10:
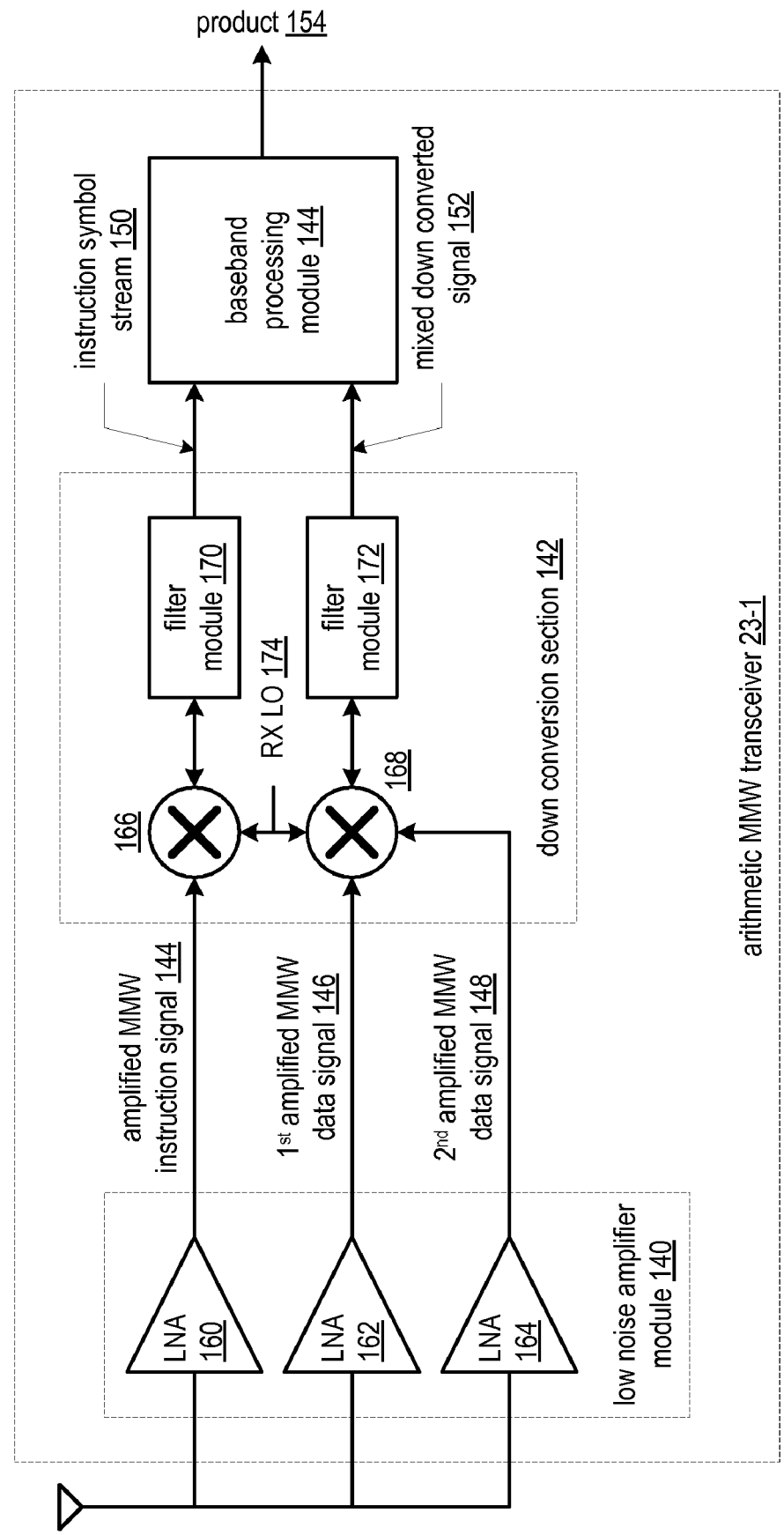
FIG. 10 is a schematic block diagram of an embodiment of a multiply-accumulate MMW transceiver in accordance with the present invention.

FIG. 10 is a schematic block diagram of an embodiment of an arithmetic MMW transceiver 23-1 that includes the low noise amplifier module 140, the down conversion section 142, and the baseband processing module 144. The low noise amplifier module 140 includes three low noise amplifiers (LNA) 160, 162, & 163. The down conversion section 142 includes mixing modules 166 & 168 and filter modules 170 & 172. The baseband processing module 144 functions as previously described to produce the product 154.

The first low noise amplifier 160 amplifies the MMS instruction signal to produce the amplified MMW instruction signal 144. The first mixing module 166, which includes a direct conversion mixer or a superheterodyne mixing structure, mixes the amplified MMW instruction signal 144 with the receive local oscillation 174 to produce a down converted instruction signal. The first filter module 170, which includes a single side band filtering structure such that the desired component of the mixed signal is passed and undesired components of the mixed signal are attenuated, filters the down converted instruction signal to produce the instruction symbol stream 150.

The second low noise amplifier 162 amplifies the first MMW data signal to produce the first amplified MMW data signal 146 and the third low noise amplifier 164 amplifies the second MMW data signal to produce the second amplified MMW data signal 148. The second mixing module 172, which includes a direct conversion mixer or a superheterodyne mixing structure, mixes the first amplified MMW data signal 144, the second amplified MMW data signal 146, and the receive local oscillation 174 in accordance with the multiple command to produce a second down converted signal. The second filter module 172, which includes a single side band filtering structure such that the desired component of the mixed signal is passed and undesired components of the mixed signal are attenuated, filters the second down converted signal to produce the mixed down converted signal 152.

Figure 11:
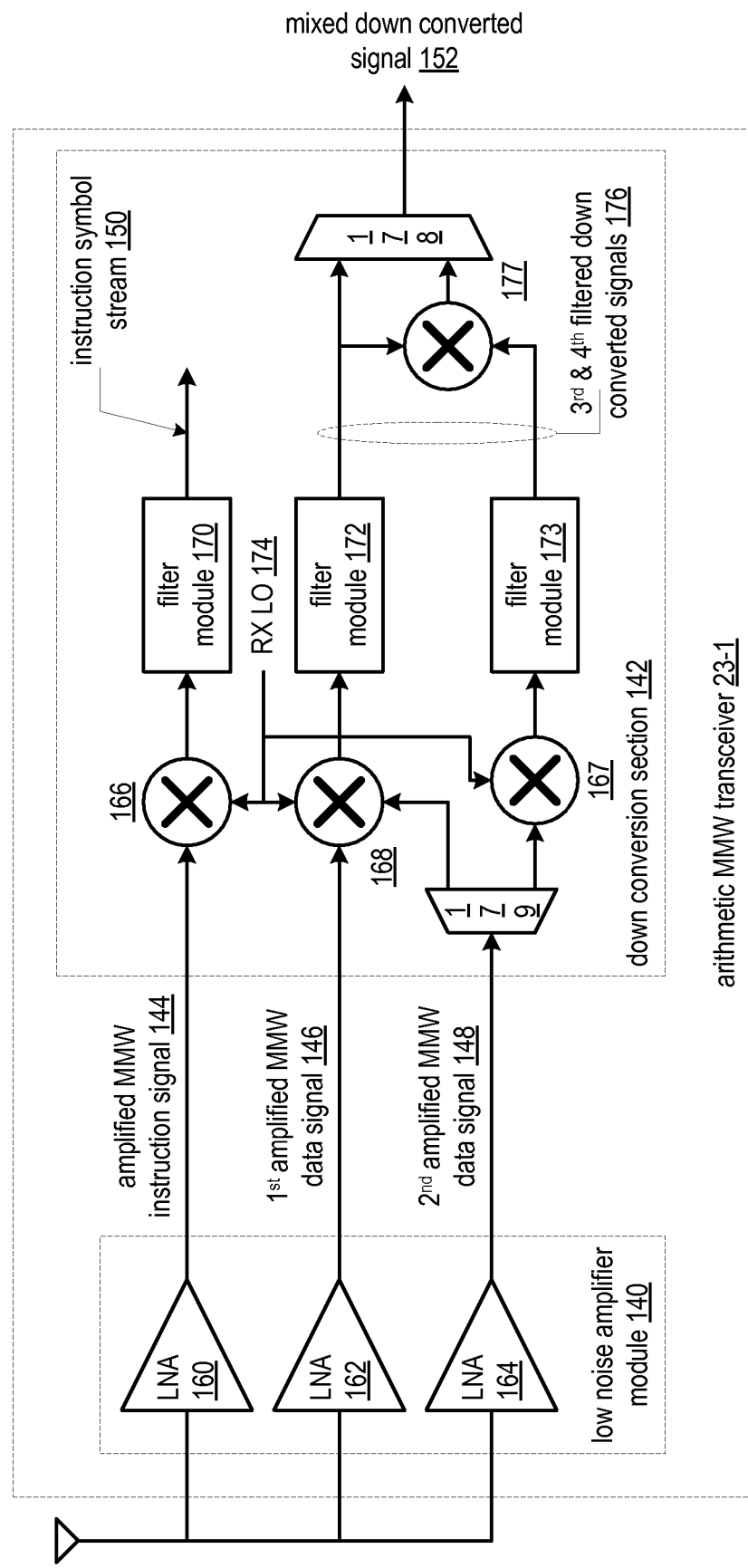
FIG. 11 is a schematic block diagram of another embodiment of a multiply-accumulate MMW transceiver in accordance with the present invention.

FIG. 11 is a schematic block diagram of another embodiment of arithmetic MMW transceiver 23-1 that includes the low noise amplifier module 140, the down conversion section 142, and the baseband processing module 144 (not shown). The low noise amplifier module 140 includes three low noise amplifiers (LNA) 160, 162, & 163. The baseband processing module 144 functions as previously described to produce the product 154.

In this embodiment, the down conversion section 142 includes three mixing modules 166, 167, & 168, three filter modules 170, 172, & 173, two multiplexers 178 & 179, and a multiplying module 177. The multiplexer 178 provides the second amplified MMW data signal 148 to the second mixing module 168 in accordance with the multiply command and provides the second amplified MMW data signal 148 to a third mixing module 167 in accordance with a second multiply command. When the multiply command is active, the down conversion section 142 functions as previously discussed with reference to FIG. 10. Note that the baseband processing module 144 extracts the multiply commands from the received instruction.

When the second multiply command is active, the third mixing module 167, which includes a direct conversion mixer or a superheterodyne mixing structure, mixes the second amplified MMW data signal 146 and the receive local oscillation 174 to produce a third down converted signal and the second mixing module 168 mixes the first amplified MMW data signal 146 and the receive local oscillation 174 to produce a fourth down converted signal.

The third filter module 173, which includes a single side band filtering structure such that the desired component of the mixed signal is passed and undesired components of the mixed signal are attenuated, filters the third down converted signal to produce a filtered third down converted signal 176. The second filter module 172 filters the fourth down converted signal to produce a filtered fourth down converted signal 176.

The multiplying module 177, which may include a mixer or a multiplier, multiplies the filtered third and fourth down converted signals 176 to produce the mixed down converted signal 152. In an alternate embodiment, the third and fourth filtered down converted signals 176 may be converted to digital signals via analog to digital converters and the digital versions are multiplied to produce a digital mixed down converted signal.

Figure 12:
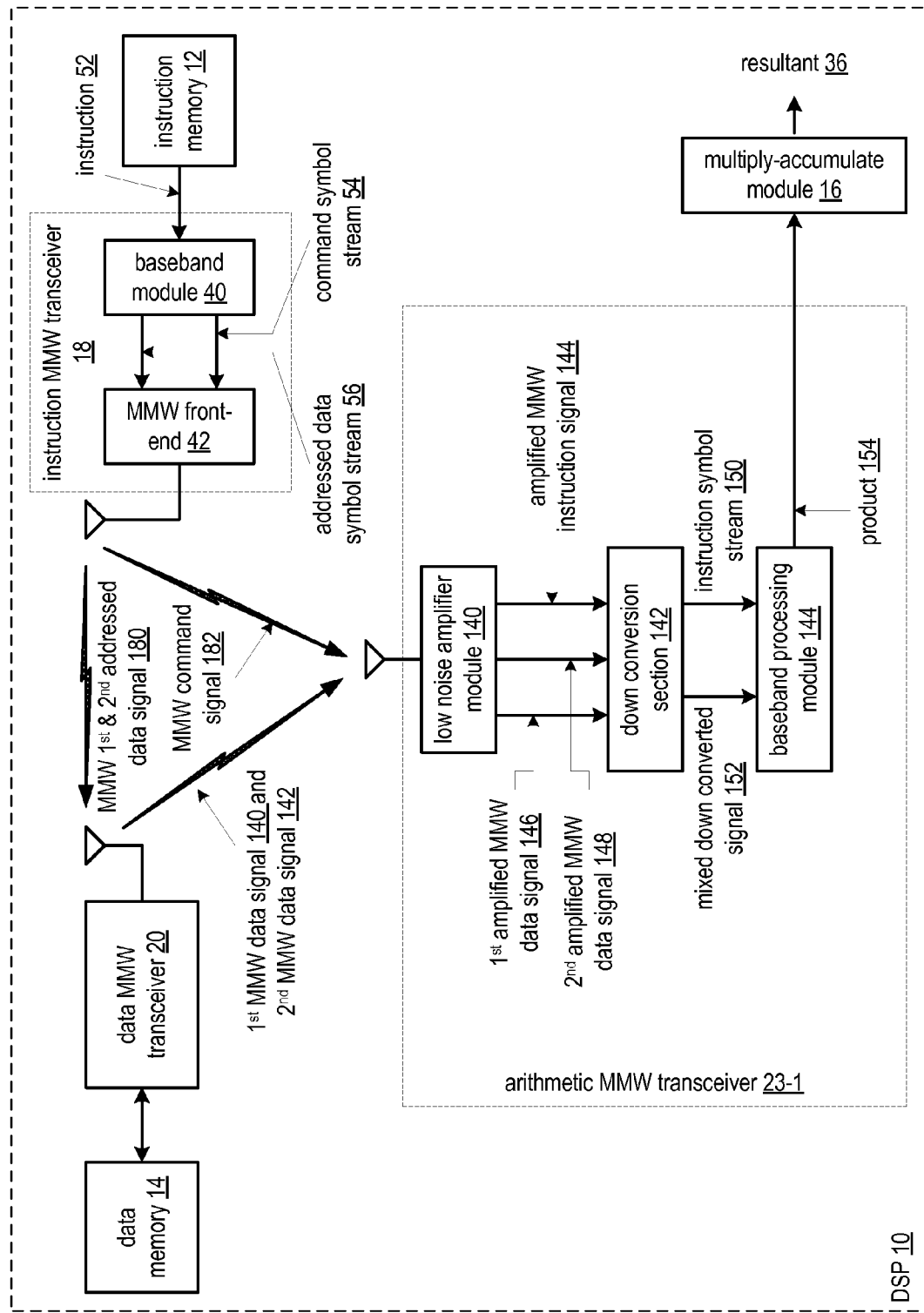
FIG. 12 is a schematic block diagram of another embodiment of a distributed DSP in accordance with the present invention.

FIG. 12 is a schematic block diagram of another embodiment of a distributed DSP 10 that includes the instruction memory 12, the data memory 14, the arithmetic module 17, the instructions MMW transceiver 18, the data MMW transceiver 20, and an arithmetic MMW transceiver 23-1. The arithmetic MMW transceiver 23-1 includes a low noise amplifier module 140, a down conversion section 142, and a baseband processing module 144. The data memory 14, the data MMW transceiver 20, the arithmetic MMW transceiver 23-1, and the arithmetic module 17 function as previously discussed.

In this embodiment, the instruction MMW transceiver 18 includes the baseband processing module 40 and the MMW front end 42 to provide program control for the DSP 10. For instance, the baseband processing module 40 retrieve the instruction 52 from the instruction memory 12; interprets the instruction to identify a command corresponding to the multiply function of the instruction, an address of the first data element, and an address of the second data element. The baseband processing module 40 continues by converting the command corresponding to the multiply function into a command symbol stream 54, converting the addresses of the first data element into a first addressed data symbol stream 56, and converting the addresses of the second data element into a second addressed data symbol stream 56.

The MMW front end 42 converts the command symbol stream 54 into a MMW command signal 182. In addition, the MMW front end 42 converts the first addressed data symbol stream 56 into a first MMW addressed data signal 180 and converts the second addressed data symbol stream 56 into a second MMW addressed data signal 180. Note that the first and second MMW addressed data signals may be separate signals or the same signal.

Figure 13:
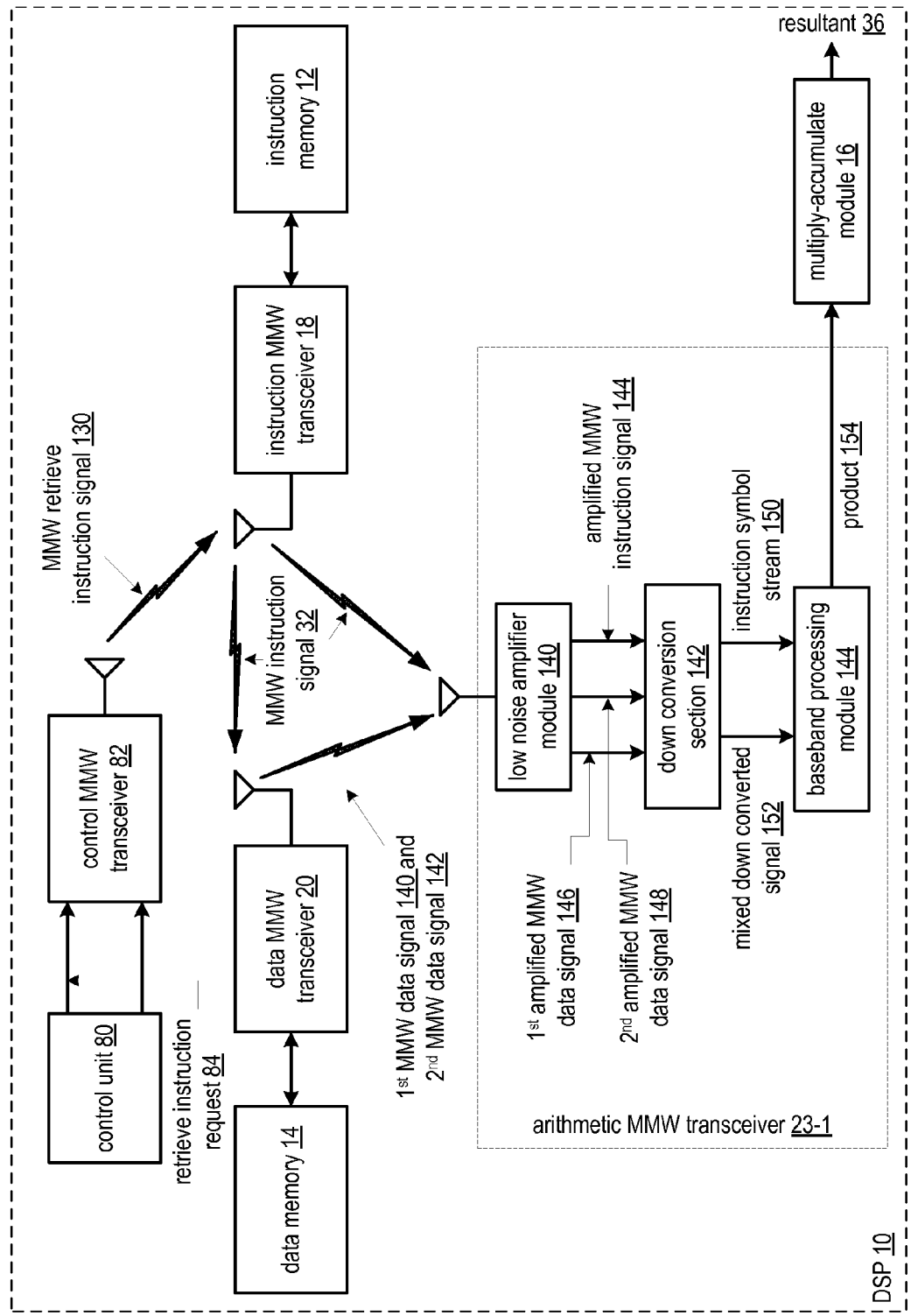
FIG. 13 is a schematic block diagram of another embodiment of a distributed DSP in accordance with the present invention.

FIG. 13 is a schematic block diagram of another embodiment of a distributed DSP 10 that includes the instruction memory 12, the data memory 14, the arithmetic module 17, the instructions MMW transceiver 18, the data MMW transceiver 20, the arithmetic MMW transceiver 23-1, the control unit 60, and the control MMW transceiver 62. The arithmetic MMW transceiver 23-1 includes a low noise amplifier module 140, a down conversion section 142, and a baseband processing module 144. The instruction memory 12, the instruction MMW transceiver 18, the data memory 14, the data MMW transceiver 20, the arithmetic MMW transceiver 23-1, and the arithmetic module 17 function as previously discussed.

The control unit 60 functions to identify the instruction and the first and second data elements based on execution of an algorithm and to generate a retrieve instruction request 84 for the instruction based on the execution of the algorithm. The control MMW transceiver 62 converts the retrieve instruction request 84 into a MMW retrieve instruction signal 130, which is received by the instruction MMW transceiver 18 to initiate the retrieval of the instruction.

Figure 14:
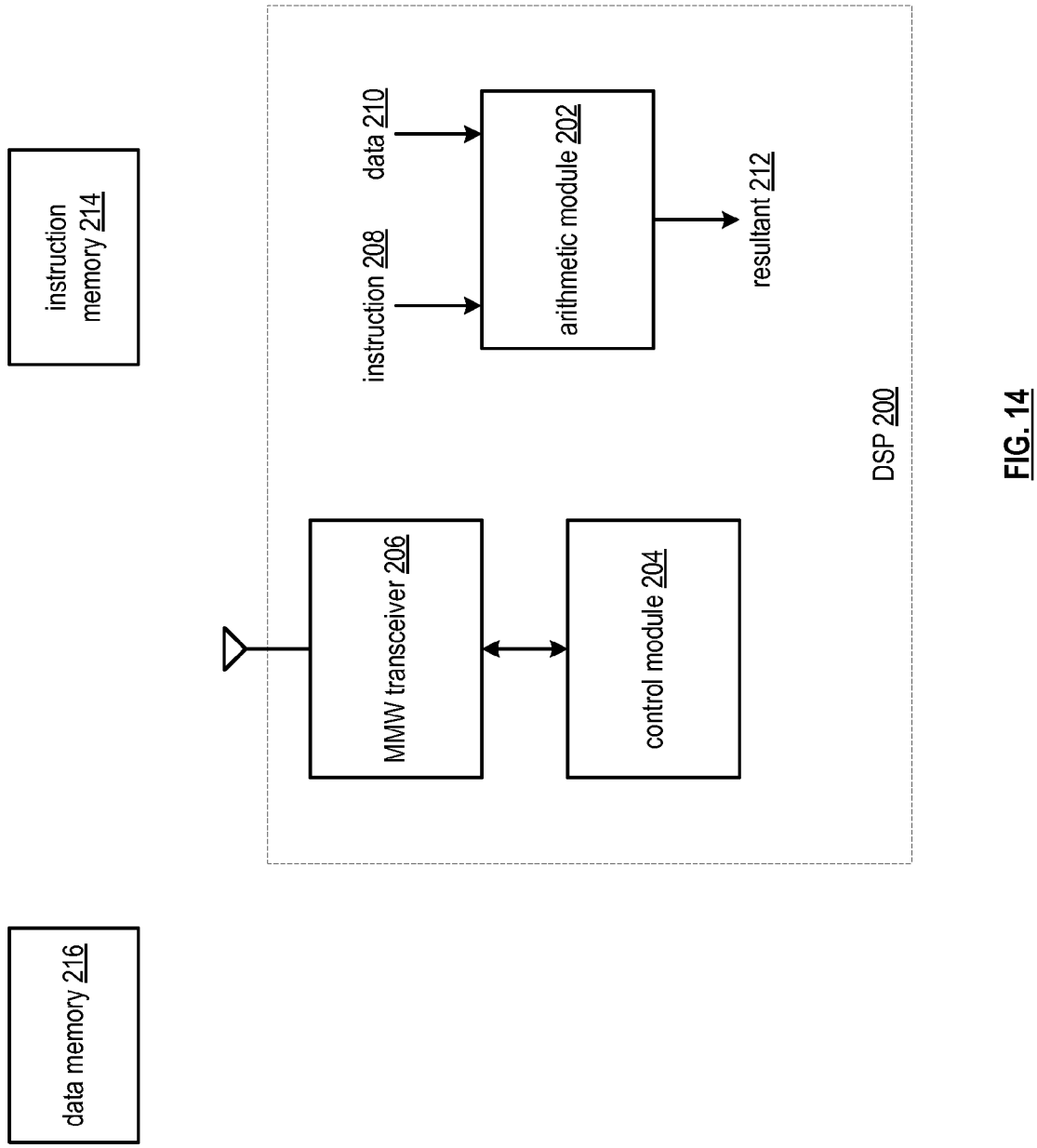
FIG. 14 is a schematic block diagram of another embodiment of a distributed DSP in accordance with the present invention.

FIG. 14 is a schematic block diagram of another embodiment of a distributed DSP 200 that includes an arithmetic module 202, a control module 204, and a MMW transceiver 206. The arithmetic module 202 may includes one or more multipliers, one or more adders, one or more ALUs, one or more floating point units, and/or one or more bit manipulation modules to execute an instruction 208 upon data 210 associated with the instruction to produce a resultant 212.

The control module, which may function similarly to control module 60, is wireless coupled to at least one of a data memory 216, an instruction memory 214, and the arithmetic module 202. Via the one or more wireless communication paths, the control module 204 coordinates retrieval of the instruction 208 from a plurality of instructions stored in the instruction memory 214 and retrieval of the data 210 of a plurality of data elements stored in the data memory 216. The MMW transceiver section 206, which may be implemented similarly to MMW transceivers 18-22, supports the wireless coupling of the control module 204 to the least one of the data memory 216, the instruction memory 214, and the arithmetic module 202.

Figure 15:
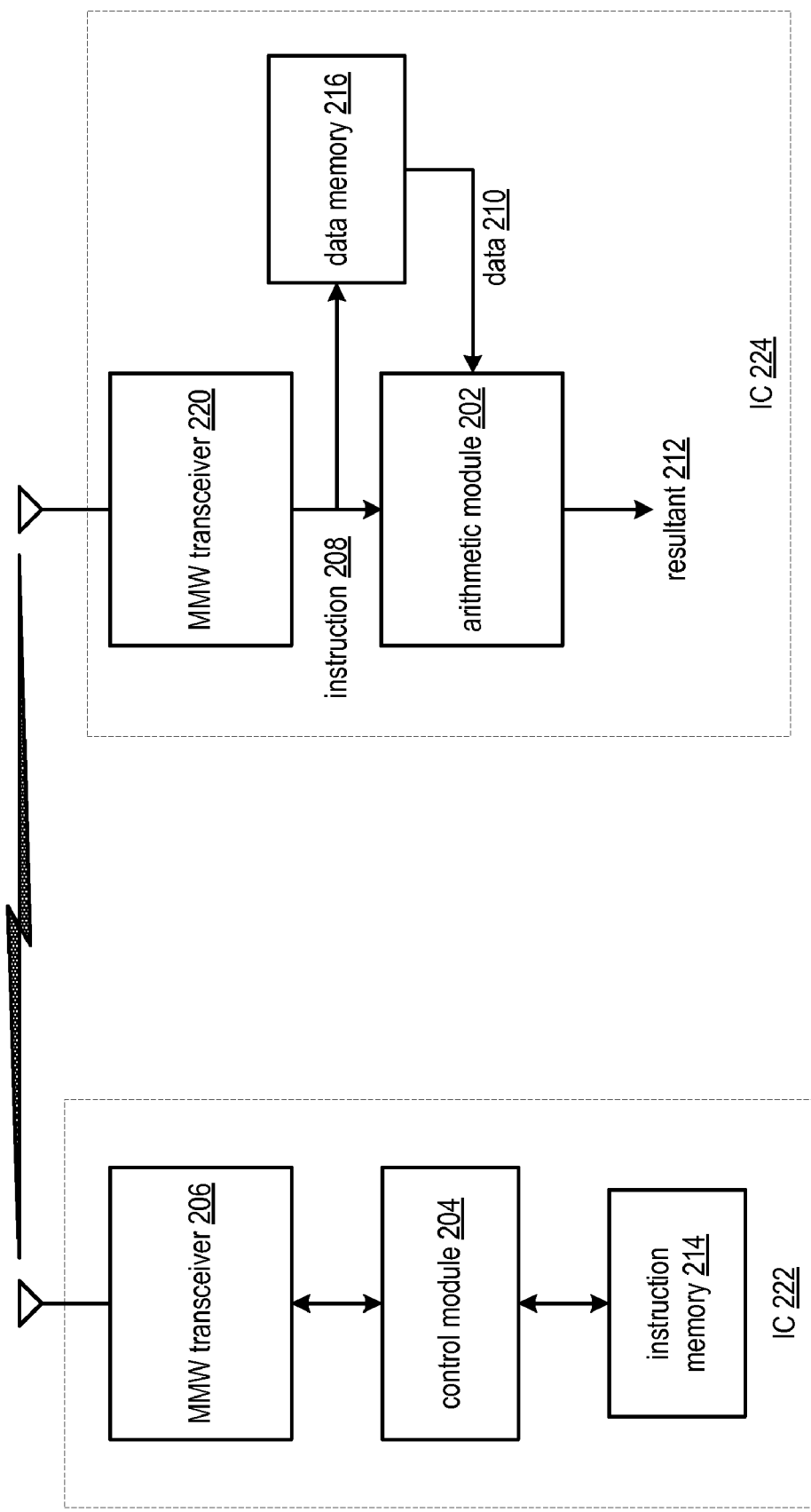
FIG. 15 is a schematic block diagram of another embodiment of a distributed DSP in accordance with the present invention.

FIG. 15 is a schematic block diagram of another embodiment of a distributed DSP 200 that includes two integrated circuits (ICs) 222 and 224. The control unit 204, the MMW transceiver 206, and the instruction memory 214 are one the first IC 222. A second MMW transceiver 220, the arithmetic module 202, and the data memory 216 are on the second IC 224.

In this embodiment, the control module 204 communicates with the instruction memory 214 on-chip, which may be done via a wired or wireless communication path. The instruction and addressed data is conveyed from the first IC 222 to the second IC 224 via the MMW transceivers 206 and 220. On the second IC 224, the MMW transceiver 220 recaptures the instruction 208 and the addressed data. The addresses are provided to the data memory 216 and the instruction is provided to the arithmetic module 202. The data memory 216 retrieves the data 210 and provides it to the arithmetic module 202, which generates the resultant 212. Note that the communication on the second IC 224 may be wired or wireless.

Figure 16:
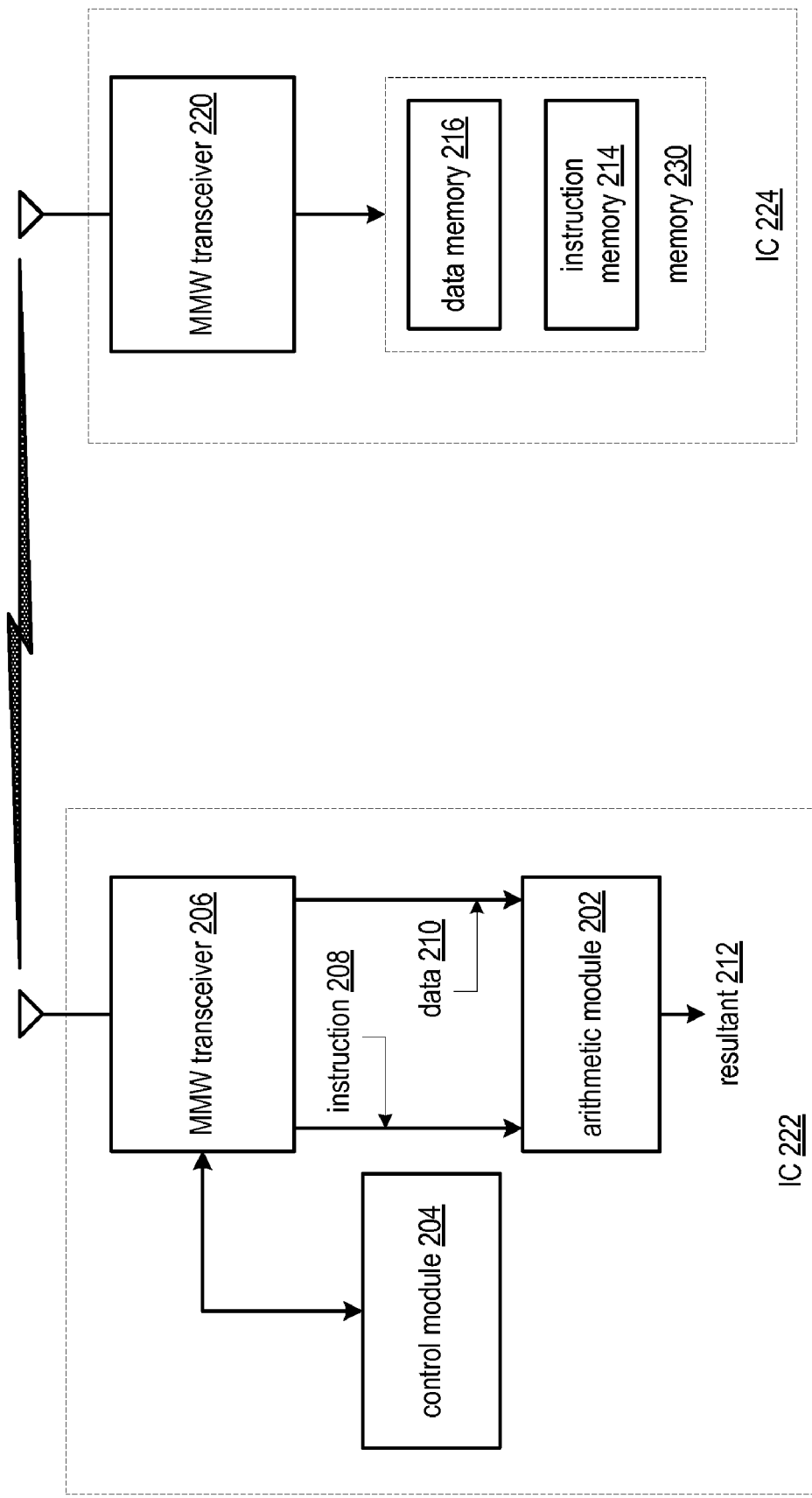
FIG. 16 is a schematic block diagram of another embodiment of a distributed DSP in accordance with the present invention.

FIG. 16 is a schematic block diagram of another embodiment of a distributed DSP 200 that includes two ICs 222 and 224. The arithmetic module 202, the control module 204, and the MMW transceiver 206 are on the first IC 222. The second IC 224 includes a second MMW transceiver 220 and memory 230, which includes the data memory 216 and the instruction memory 214. In this embodiment, the transceivers 206 and 220 convey retrieval requests and responses (e.g., instructions and data) between the ICs 222 and 224.

Figure 17:
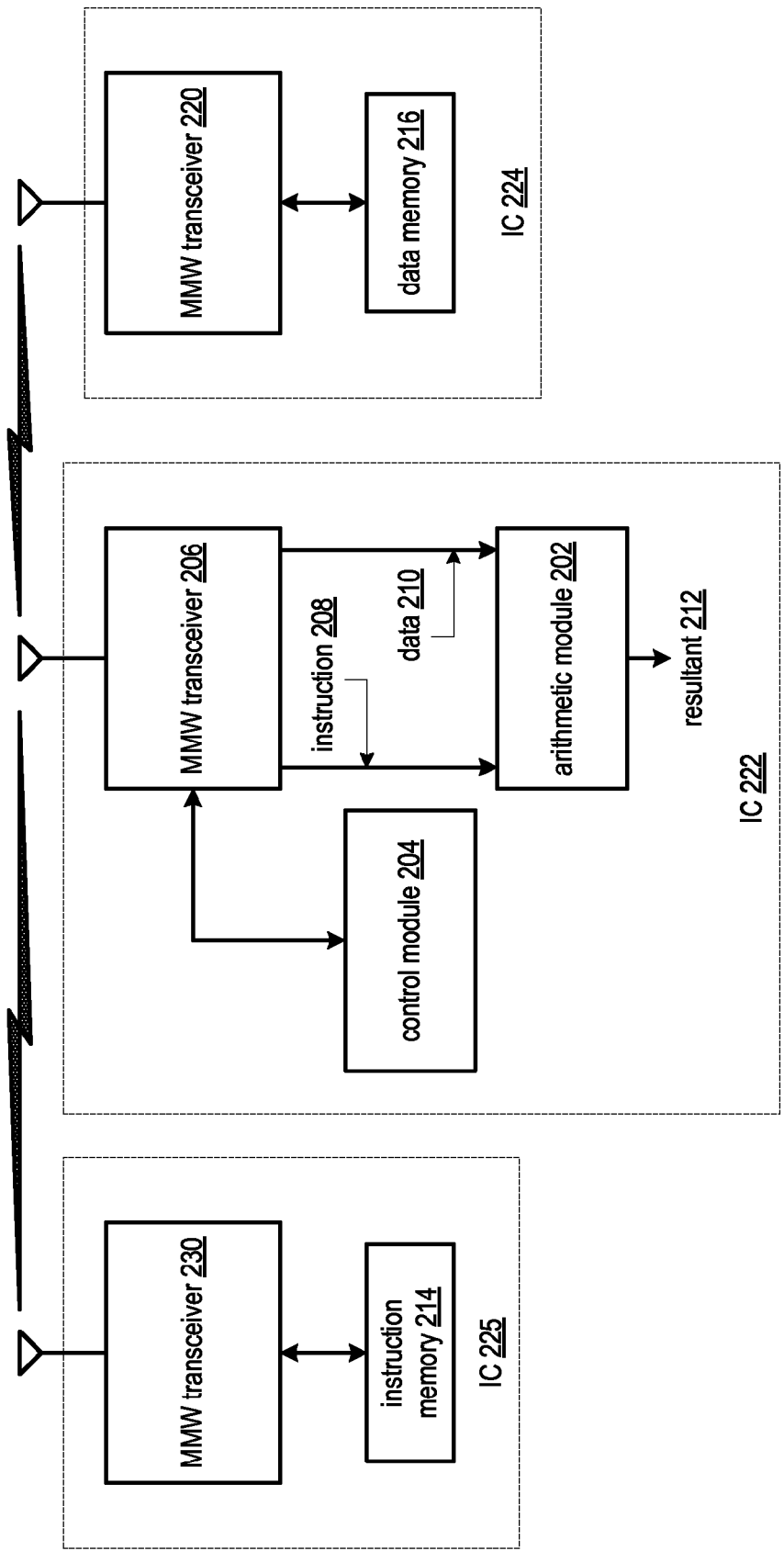
FIG. 17 is a schematic block diagram of another embodiment of a distributed DSP in accordance with the present invention.

FIG. 17 is a schematic block diagram of another embodiment of a distributed DSP 200 that includes three integrated circuits 222, 224, and 225. The arithmetic module 202, the control module 204, and the MMW transceiver 206 are on the first IC 222. The second integrated circuit 224 supports the second MMW transceiver 220 and the data memory 216 and the third IC 225 supports the third MMW transceiver 230 and the instruction memory 214.

The second MMW transceiver 220 and the first MMW transceiver 206 provide a data wireless link between the control module 204 and the data memory 216. The third MMW transceiver 230 and the first MMW transceiver provide an instruction wireless link between the control module 204 and the instruction memory 214.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A distributed digital signal processor (DSP) comprises:
an instruction memory that stores a plurality of instructions;
a data memory that stores a plurality of data elements;
a multiply-accumulate module that performs a function upon first and second data elements of the plurality of data elements in accordance with a command of an instruction of the plurality of instructions to produce a resultant;
an instruction millimeter wave (MMW) transceiver coupled to the instruction memory, wherein the instruction MMW transceiver:
retrieves an instruction from the instruction memory;
interprets the instruction to identify a function from a plurality of functions, an address of the first data element, and an address of the second data element;
converts a command corresponding to the function into a command symbol stream;
converts the addresses of the first and second data elements into an addressed data symbol stream;
converts the command symbol stream into a MMW command signal; and
converts the addressed data symbol stream into a MMW addressed data signal, the MMW command signal and the MMW data signal forming a MMW instruction signal; and
transmits a the MMW instruction signal that includes at least a portion of the instruction;
a data MMW transceiver coupled to the data memory, wherein the data MMW transceiver transmits a MMW data signal in response to receiving the MMW instruction signal, wherein the MMW data signal includes the first and second data elements; and
a multiply-accumulate MMW transceiver coupled to the multiply-accumulate module, wherein the multiply-accumulate MMW transceiver recovers the first and second data elements from the MMW data signal and recovers a command corresponding to the function from the MMW instruction signal; and
a control unit operable to:
identify the instruction based on execution of an algorithm;
generate a retrieve instruction request for the instruction based on the execution of the algorithm;
identify the first and second data elements; and
generate a retrieve data request for the first and second data elements;

a control MMW transceiver coupled to:
convert the retrieve instruction request into a MMW retrieve instruction signal, wherein the instruction MMW transceiver transmits the MMW instruction signal in response to receiving the MMW retrieve instruction signal; and
convert the retrieve data request into a MMW data request signal, wherein the data MMW transceiver transmits a MMW data signal in response to receiving the MMW retrieve data signal.

2. The distributed DSP of claim 1, wherein the data MMW transceiver comprises:
a data MMW front end coupled to:
recover the addressed data symbol stream from the MMW data signal; and
convert a data symbol stream into the MMW data signal; and
a data baseband processing module coupled to:
recover the addresses of the first and second data elements from the addressed data symbol stream;
provide the addresses of the first and second data elements to the data memory;
receive the first and second data elements from the data memory; and
convert the first and second data elements into the data symbol stream.

3. The distributed DSP of claim 1, wherein the multiply-accumulate MMW transceiver comprises:
a multiply-accumulate MMW front-end coupled to:
recover a data symbol stream from the MWM data signal; and
recover the command symbol stream from the MMW command signal; and
a multiply-accumulate baseband processing module coupled to:
recover the first and second data elements from the data symbol stream; and
recover the command that corresponds to the function from the command symbol stream.

4. The distributed DSP of claim 1, wherein the multiply-accumulate module comprises:
at least one multiplier; and
at least one of an arithmetic logic unit, an adder, and a bit manipulation module.

5. A distributed digital signal processor (DSP) comprises:
an instruction memory that stores a plurality of instructions;
a data memory that stores a plurality of data elements;
an arithmetic module that performs an arithmetic function upon a product of first and second data elements of the plurality of data elements in accordance with an instruction of the plurality of instructions to produce a resultant;
an instruction millimeter wave (MMW) transceiver coupled to the instruction memory, wherein the instruction MMW transceiver transmits a MMW instruction signal that includes the instruction;
a data MMW transceiver coupled to the data memory, wherein the data MMW transceiver includes:
a baseband processing module coupled to:
receive the first and second data elements from the data memory;
convert the first data element into a first data symbol stream; and
convert the second data element into a second data symbol stream;
an up conversion mixing module coupled to:
mix the first data symbol stream, the second data symbol stream, and a transmit local oscillation in accordance with a multiply function of the instruction to produce a multiplied mixed signal that includes the product of first and second data elements;
wherein the up conversion mixing module comprises a first multiplier, a second multiplier, a first filter, a second filter, a second power amplifier module, and a multiplexer coupled to the first and second multipliers, wherein:
in accordance with the multiply function of the instruction:
the multiplexer provides the second data symbol stream to the first multiplier;
the first multiplier multiplies the first data symbol stream, the second data symbol stream, and the transmit local oscillation to produce an intermediate product; and
the first filter module coupled to filter the intermediate product to produce the multiplied mixed signal; and
in accordance with a data request of the instruction:
the multiplexer provides the second data symbol stream to the second multiplier;
the first multiplier multiplies the first data symbol stream and the transmit local oscillation to produce a first mixed signal; and
the first filter module coupled to filter the first mixed signal to produce a first MMW data signal;
the second multiplier multiplies the second data symbol stream and the transmit local oscillation to produce a second mixed signal;
the second filter module coupled to filter the second mixed signal to produce a second MMW data signal;
the second power amplifier amplifies the second MMW data signal;
a power amplifier module coupled to amplify the multiplied mixed signal to produce a MMW data product signal; and
an arithmetic MMW transceiver coupled to the arithmetic module, wherein the arithmetic MMW transceiver recovers the product of first and second data elements from the MMW data product signal and recovers the command corresponding to the arithmetic function from the MMW instruction signal.

6. The distributed DSP of claim 5, wherein the data MMW transceiver further comprises:
a low noise amplifier coupled to amplify the MMW instruction signal to produce an amplified MMW instruction signal;
a down conversion mixing module coupled to convert the amplified MMW instruction signal into an instruction symbol stream in accordance with a local oscillation;
the baseband processing module coupled to:
recover the instruction from the instruction symbol stream;
interpret the instruction to identify addresses of the first and second data elements and a multiply function;
provide the addresses of the first and second data elements to the data memory;
receive the first and second data elements from the data memory;

convert the first data element into a first data symbol stream; and convert the second data element into a second data symbol stream.

7. The distributed DSP of claim 5, wherein the up conversion mixing module comprises:

a first multiplier coupled to multiply the first data symbol stream, the second data symbol stream, and the transmit local oscillation to produce an intermediate product; and a filter module coupled to filter the intermediate product to the multiplied mixed signal.

8. The distributed DSP of claim 5, wherein the instruction MMW transceiver comprises:

a baseband processing module operable to:
retrieve the instruction from the instruction memory;
interpret the instruction to identify a multiply command corresponding to the multiply function of the instruction, an arithmetic command, an address of the first data element, and an address of the second data element;
convert the arithmetic command into a command symbol stream; and
convert the multiply command and the addresses of the first and second data elements into an address and multiply command symbol stream;

a MMW front end coupled to:
convert the command symbol stream into a MMW arithmetic command signal; and
convert the address and multiply command symbol stream into a MMW address and command signal, wherein the MMW instruction signal includes the MMW arithmetic command signal and the MMW address and multiply command signal.

9. The distributed DSP of claim 5 further comprises:

a control unit operable to:
identify the instruction and the first and second data elements based on execution of an algorithm; and
generate a retrieve instruction request for the instruction based on the execution of the algorithm;

a control MMW transceiver coupled to:
convert the retrieve instruction request into a MMW retrieve instruction signal, wherein the instruction MMW transceiver transmits the MMW instruction signal in response to receiving the MMW retrieve instruction signal.

10. A distributed digital signal processor (DSP) comprises:

an instruction memory that stores a plurality of instructions;

a data memory that stores a plurality of data elements;

an arithmetic module that performs an arithmetic function upon a product of first and second data elements of the plurality of data elements in accordance with an instruction of the plurality of instructions to produce a resultant;

an instruction millimeter wave (MMW) transceiver coupled to the instruction memory, wherein the instruction MMW transceiver transmits a MMW instruction signal that includes the instruction;

a data MMW transceiver coupled to the data memory, wherein the data MMW transceiver transmits a first MMW data signal and second MMW data signal in response to receiving the MMW instruction signal, wherein the first MMW data signal includes the first data element and the second MMW data signal includes the second data element; and an arithmetic MMW transceiver coupled to the arithmetic module, wherein the arithmetic MMW transceiver includes:

a low noise amplifier section coupled to:
amplify the MMS instruction signal to produce an amplified MMW instruction signal;
amplify the first MMW data signal to produce a first amplified MMW data signal; and
amplify the second MMW data signal to produce a second amplified MMW data signal;

a down conversion section coupled to:
convert the amplified MMW instruction signal into an instruction symbol stream; and
mix the first amplified MMW data signal, the second amplified MMW data signal, and a receive local oscillation to produce a mixed down converted signal in accordance with a multiply command; and a baseband processing module coupled to:
recover the command and the multiply command from the instruction symbol stream;
convert the mixed down converted signal into the product of first and second data elements; and
provide the product of the first and second data elements to the arithmetic module.

11. The distributed DSP of claim 10, wherein the low noise amplifier section comprises:

a first low noise amplifier coupled to amplify the MMS instruction signal to produce the amplified MMW instruction signal;

a second low noise amplifier coupled to amplify the first MMW data signal to produce the first amplified MMW data signal; and a third low noise amplifier coupled to amplify the second MMW data signal to produce the second amplified MMW data signal.

12. The distributed DSP of claim 11, wherein the down conversion section comprises:

a first mixing module coupled to mix the amplified MMW instruction signal with the receive local oscillation to produce a down converted instruction signal;

a first filter module coupled to filter the down converted instruction signal to produce the instruction symbol stream;

a second mixing module coupled to mix the first amplified MMW data signal, the second amplified MMW data signal, and the receive local oscillation in accordance with the multiple command to produce a second down converted signal; and a second filter module coupled to filter the second down converted signal to produce the mixed down converted signal.

13. The distributed DSP of claim 12, wherein the down conversion section further comprises:

a multiplexer coupled to provide the second amplified MMW data signal to the second mixing module in accordance with the multiply command and to provide the second amplified MMW data signal to a third mixing module in accordance with a second multiply command;

the third mixing module coupled to mix the second amplified MMW data signal and the receive local oscillation to produce a third down converted signal, wherein the second mixing module mixes the first amplified MMW data signal and the receive local oscillation to produce a fourth down converted signal and the second filter module filters the fourth down converted signal to produce a filtered fourth down converted signal;

a third filter module coupled to filter the third down converted signal to produce a filtered third down converted signal;

a multiplying module coupled to multiply the filtered third and fourth down converted signals to produce the mixed down converted signal.

14. The distributed DSP of claim 10, wherein the instruction MMW transceiver comprises:
a baseband processing module operable to:
retrieve the instruction from the instruction memory;
interpret the instruction to identify a command corresponding to the multiply function of the instruction, an address of the first data element, and an address of the second data element;
convert the command corresponding to the multiply function into a command symbol stream;
convert the addresses of the first data element into a first addressed data symbol stream; and
convert the addresses of the second data element into a second addressed data symbol stream;
a MMW front end coupled to:
convert the command symbol stream into a MMW command signal; and
convert the first addressed data symbol stream into a first MMW addressed data signal; and
convert the second addressed data symbol stream into a second MMW addressed data signal, wherein the MMW instruction signal includes the MMW command signal, the first MMW addressed data signal, and the second MMW addressed data signal.

15. The distributed DSP of claim 10 further comprises:
a control unit operable to:
identify the instruction and the first and second data elements based on execution of an algorithm; and
generate a retrieve instruction request for the instruction based on the execution of the algorithm;
a control MMW transceiver coupled to:
convert the retrieve instruction request into a MMW retrieve instruction signal, wherein the instruction MMW transceiver transmits the MMW instruction signal in response to receiving the MMW retrieve instruction signal.

16. A distributed digital signal processor (DSP) comprises:
a data MMW transceiver coupled to a data memory, wherein the data memory stores a plurality of data elements;
an instruction millimeter wave (MMW) transceiver coupled to an instruction memory, wherein the instruction MMW transceiver transmits a MMW instruction signal that includes an instruction stored in the instruction memory;
an arithmetic module that performs an arithmetic function upon a product of first and second data elements of the plurality of data elements in accordance with the instruction to produce a resultant;
wherein the data MMW transceiver includes:
a baseband processing module coupled to:
receive the first and second data elements from the data memory;
convert the first data element into a first data symbol stream; and
convert the second data element into a second data symbol stream;
an up conversion mixing module coupled to:
mix the first data symbol stream, the second data symbol stream, and a transmit local oscillation in accordance with a multiply function of the instruction to produce a multiplied mixed signal that includes the product of first and second data elements; and
to produce a MMW data product signal with the product of the first and second data elements;
an arithmetic MMW transceiver coupled to the arithmetic module, wherein the arithmetic MMW transceiver recovers the product of first and second data elements from the MMW data product signal and recovers the command corresponding to the arithmetic function from the MMW instruction signal.

17. The DSP of claim 16, wherein the up conversion mixing module comprises a first multiplier, a second multiplier, a first filter, a second filter, a second power amplifier module, and a multiplexer coupled to the first and second multipliers, and wherein in accordance with the multiply function of the instruction:
the multiplexer provides the second data symbol stream to the first multiplier;
the first multiplier multiplies the first data symbol stream, the second data symbol stream, and the transmit local oscillation to produce an intermediate product; and
the first filter module coupled to filter the intermediate product to produce the multiplied mixed signal; and
in accordance with a data request of the instruction:
the multiplexer provides the second data symbol stream to the second multiplier;
the first multiplier multiplies the first data symbol stream and the transmit local oscillation to produce a first mixed signal; and
the first filter module coupled to filter the first mixed signal to produce a first MMW data signal;
the second multiplier multiplies the second data symbol stream and the transmit local oscillation to produce a second mixed signal;
the second filter module coupled to filter the second mixed signal to produce a second MMW data signal;
the second power amplifier amplifies the second MMW data signal.

18. The DSP of claim 17, wherein the up conversion mixing module further comprises a power amplifier module coupled to amplify the multiplied mixed signal to produce a MMW data product signal.

19. The distributed DSP of claim 18, wherein the data MMW transceiver further comprises:
a low noise amplifier coupled to amplify the MMW instruction signal to produce an amplified MMW instruction signal;
a down conversion mixing module coupled to convert the amplified MMW instruction signal into an instruction symbol stream in accordance with a local oscillation;
the baseband processing module coupled to:
recover the instruction from the instruction symbol stream;
interpret the instruction to identify addresses of the first and second data elements and a multiply function;
provide the addresses of the first and second data elements to the data memory;
receive the first and second data elements from the data memory;
convert the first data element into a first data symbol stream; and
convert the second data element into a second data symbol stream.

20. The distributed DSP of claim 19, wherein the instruction MMW transceiver comprises:

a baseband processing module operable to:
  retrieve the instruction from the instruction memory;
  interpret the instruction to identify a multiply command corresponding to the multiply function of the instruction, an arithmetic command, an address of the first data element, and an address of the second data element;
  convert the arithmetic command into a command symbol stream; and
  convert the multiply command and the addresses of the first and second data elements into an address and multiply command symbol stream;

a MMW front end coupled to:
  convert the command symbol stream into a MMW arithmetic command signal; and
  convert the address and multiply command symbol stream into a MMW address and command signal, wherein the MMW instruction signal includes the MMW arithmetic command signal and the MMW address and multiply command signal.

* * * * *

UNITED STATES PATENT AND TRADEMARK OFFICE
CERTIFICATE OF CORRECTION

PATENT NO.        : 8,280,303 B2
APPLICATION NO.   : 12/202257
DATED             : October 2, 2012
INVENTOR(S)       : Ahmadreza Rofougaran et al.

It is certified that error appears in the above-identified patent and that said Letters Patent is hereby corrected as shown below:

In the Claims:

Col. 14, line 47, in Claim 1: Replace "a the MMW" with --the MMW--

Signed and Sealed this
Third Day of September, 2013

Teresa Stanek Rea
*Acting Director of the United States Patent and Trademark Office*